(12) United States Patent
Amemiya

(10) Patent No.: US 8,984,055 B2
(45) Date of Patent: Mar. 17, 2015

(54) RELAY DEVICE, INFORMATION PROCESSING SYSTEM, AND COMPUTER-READABLE RECORDING MEDIUM

(71) Applicant: Fujitsu Limited, Kawasaki-shi (JP)

(72) Inventor: Kouichirou Amemiya, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 242 days.

(21) Appl. No.: 13/736,690

(22) Filed: Jan. 8, 2013

(65) Prior Publication Data

US 2013/0246507 A1 Sep. 19, 2013

(30) Foreign Application Priority Data

Mar. 19, 2012 (JP) .................................. 2012-062779

(51) Int. Cl.
*H04L 29/08* (2006.01)

(52) U.S. Cl.
CPC ............ *H04L 67/14* (2013.01); *H04L 67/2814* (2013.01); *H04L 67/146* (2013.01)
USPC ........... 709/203; 709/228; 709/217; 709/219; 709/205; 709/227; 715/741; 715/208; 715/736; 715/234; 713/168; 713/176; 726/22; 726/3

(58) Field of Classification Search
CPC ....................................................... H04L 67/14
USPC ......... 709/203, 205, 207, 208, 217, 219, 245, 709/223, 228
See application file for complete search history.

(56) References Cited

U.S. PATENT DOCUMENTS

| 6,801,776 | B2 | 10/2004 | Notani et al. | |
|---|---|---|---|---|
| 7,492,764 | B2 * | 2/2009 | Cheng et al. | 370/389 |
| 2008/0244667 | A1 * | 10/2008 | Osborne | 725/94 |
| 2009/0089574 | A1 * | 4/2009 | Pryor et al. | 713/150 |
| 2010/0251144 | A1 * | 9/2010 | Shaty | 715/760 |
| 2012/0030732 | A1 * | 2/2012 | Shaty | 726/3 |
| 2012/0265857 | A1 * | 10/2012 | Kano | 709/219 |

FOREIGN PATENT DOCUMENTS

| JP | 2000-90024 | 3/2000 |
|---|---|---|
| JP | 2003-296289 | 10/2003 |
| JP | 2004-511140 | 4/2004 |
| JP | 2008-259114 | 10/2008 |
| WO | WO 02/28118 | 4/2002 |

* cited by examiner

*Primary Examiner* — Jude Jean Gilles
(74) *Attorney, Agent, or Firm* — Fujitsu Patent Center

(57) ABSTRACT

A relay device includes a memory and a processor coupled to the memory. The processor executes a process including storing association relationship information in which a session identifier for identifying a session established between a server and a client by a program running on the server is associated with a server identifier for identifying the server. The process includes determining whether a session identifier contained in a message received from a distributing device is contained in the association relationship information stored at the storing. The process includes selecting a relay system used when the received message is transferred to the server in accordance with a program that has established a session indicated by the session identifier contained in the message. The process includes transferring the message by using the relay system selected at the selecting.

10 Claims, 27 Drawing Sheets

FIG.2

| ORDER | SITE | CATEGORY | VIEWER | PAGE VIEW | UPDATE FREQUENCY |
|---|---|---|---|---|---|
| 1 | aaa.com | Social Networks | 540,000,000 | 570,000,000,000 | 1/351 |
| 2 | bbb.com | Web Portals | 490,000,000 | 70,000,000,000 | 1/47 |
| 3 | ccc.com | Search Engines | 370,000,000 | 39,000,000,000 | 1/35 |
| 4 | ddd.com | Dictionaries & Encyclopedias | 310,000,000 | 7,900,000,000 | 1/8 |
| 5 | eee.com | Web Portals | 280,000,000 | 11,000,000,000 | 1/13 |
| 6 | fff.com | Software | 230,000,000 | 3,300,000,000 | 1/4 |
| 7 | ggg.com | Blogging Resources & Services | 230,000,000 | 4,400,000,000 | 1/6 |
| 8 | hhh.com | Web Portals | 230,000,000 | 27,000,000,000 | 1/39 |
| 9 | iii.com | Email & Messaging | 170,000,000 | 25,000,000,000 | 1/49 |
| 10 | jjj.com | Internet Clients & Browsers | 140,000,000 | 2,100,000,000 | 1/5 |
| 80 | kkk.com | ISPs | 28,000,000 | 660,000,000 | 1/7 |
| 726 | lll.com | Social Networks | 5,500,000 | 7,800,000,000 | 1/472 |

FIG.3

| RELAY DESTINATION INFORMATION DISTRIBUTION SYSTEM | MULTI DESTINATION DISTRIBUTION | PARTIAL DISTRIBUTION | | |
|---|---|---|---|---|
| RELAY SYSTEM | SYNCHRONIZE MESSAGE RELAY INFORMATION | DISTRIBUTE MESSAGE RELAY INFORMATION TRANSFER TO MESSAGE RELAY DEVICE | DISTRIBUTE MESSAGE RELAY INFORMATION QUERY MESSAGE RELAY DEVICE | QUERY+REFER TO CACHE IN ITS OWN MESSAGE RELAY DEVICE |
| | SYSTEM (A) | SYSTEM (B) | SYSTEM (C) | SYSTEM (D) |
| AMOUNT OF RESOURCES CONSUMED WHEN MESSAGE IS RELAYED | SMALL | LARGE | LARGE | LARGE |
| AMOUNT OF RESOURCES CONSUMED WHEN SESSION IS UPDATED | LARGE | SMALL | SMALL | SMALL |
| EFFECT WHEN LOAD OF MESSAGE RELAY PROCESS INCREASE | SMALL | LARGE | SMALL | SMALL |

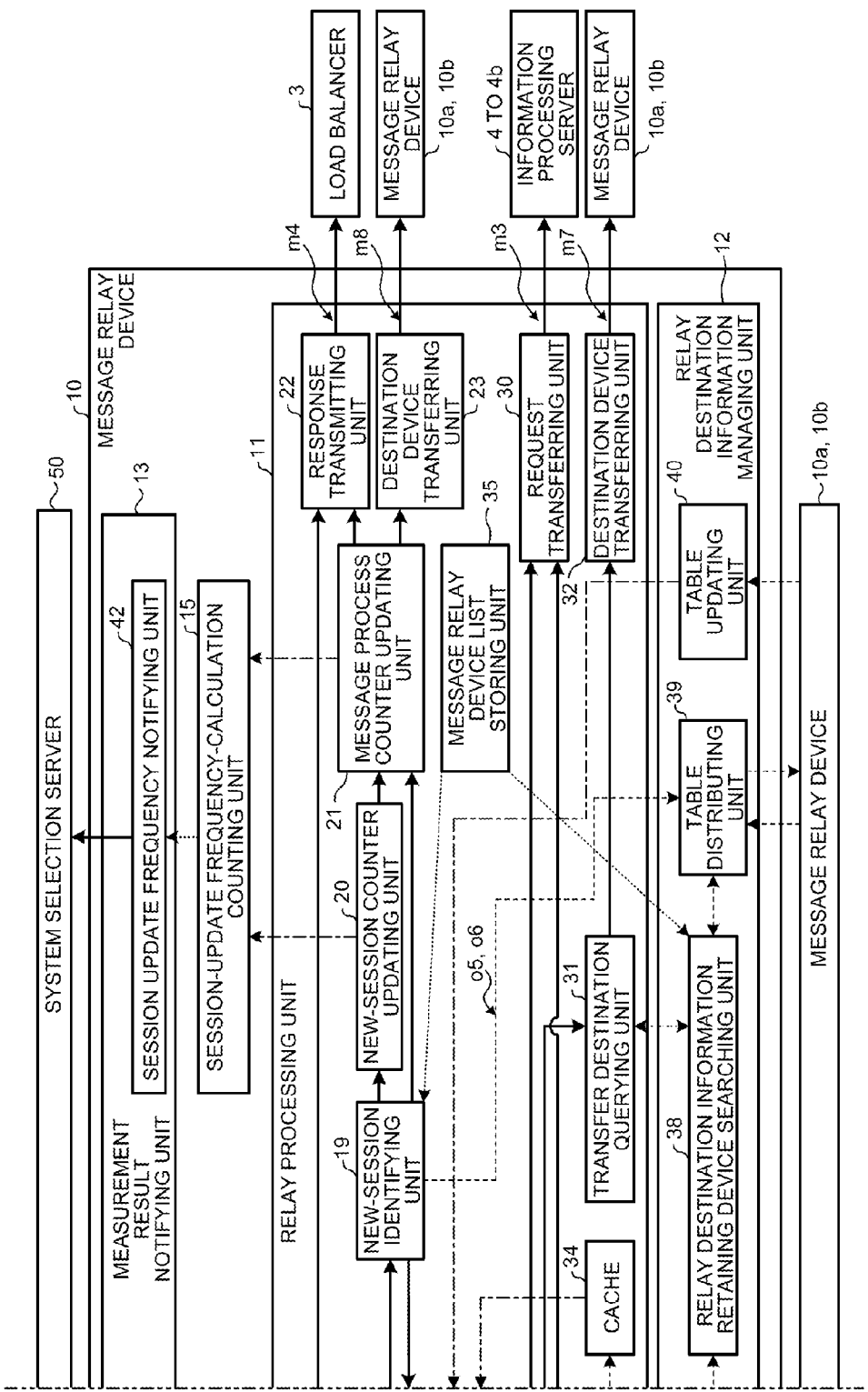

FIG.6

| URL (SERVICE) | RELAY SYSTEM |
|---|---|
| AAA.com | SYSTEM (A) |
| ⋮ | ⋮ |

FIG.7

| SESSION ID (Key) | ADDRESS OF MESSAGE RELAY DEVICE |
|---|---|
| 55D95DFF········ | 192.168.1.4 |
| ⋮ | ⋮ |

FIG.8

| MESSAGE RELAY DEVICE NUMBER | ADDRESS OF MESSAGE TRANSFER DESTINATION |
|---|---|
| 1 | 192.168.0.2 |
| 2 | 192.168.0.3 |
| ⋮ | ⋮ |

FIG.9

| URL | MESSAGE RELAY RESOURCE AMOUNT | MESSAGE TRANSFER RESOURCE AMOUNT | MESSAGE-RELAY-INFORMATION QUERY RESOURCE AMOUNT | MESSAGE-RELAY-INFORMATION DISTRIBUTION RESOURCE AMOUNT |
|---|---|---|---|---|
| AAA.com | 0:00:01 | 0:00:00 | 0:00:00 | 0:00:08 |
| ⋮ | ⋮ | ⋮ | ⋮ | ⋮ |

| URL | MESSAGE PROCESSING COUNT | SESSION ESTABLISHMENT COUNT |
|---|---|---|
| AAA.com | 257 | 1 |
| ⋮ | ⋮ | ⋮ |

| MESSAGE RELAY PROCESS ($r_{fwd}$) | =(m3-m1)+{(m4-m2)-(o6-o5)} | |
|---|---|---|
| MESSAGE RELAY PROCESS ($r_{fwd2}$) | =(m7-m6)+(m3-m5)+(m4-m9) | |
| MESSAGE RELAY DESTINATION INFORMATION QUERY ($r_{query}$) | =o2-o1 | SYSTEM (A) |
| MESSAGE RELAY DESTINATION INFORMATION DISTRIBUTION ($r_{ctrl}$) | =(o6-o5)/N | SYSTEM (B), (C), (D) |
| | =o6-o5 | |

FIG.14

| X | =0 | SYSTEM (A) |
|---|---|---|
| | ∝ [AMOUNT OF RESOURCES NEEDED FOR TRANSFER AMONG MESSAGE RELAY DEVICES] × MISS HIT RATE | SYSTEM (B) |
| | ∝ [AMOUNT OF RESOURCES NEEDED FOR QUERY AMONG MESSAGE RELAY DEVICES] × MISS HIT RATE | SYSTEM (C), SYSTEM (D) |

FIG.15

| Y | ∝ [AMOUNT OF RESOURCES NEEDED FOR DISTRIBUTING SINGLE PIECE OF MESSAGE RELAY INFORMATION] × [NUMBER OF MESSAGE RELAY DEVICES] × [SESSION UPDATE FREQUENCY] | SYSTEM (A) |
|---|---|---|
| | ∝ [AMOUNT OF RESOURCES NEEDED FOR DISTRIBUTING SINGLE PIECE OF MESSAGE RELAY INFORMATION] × [NUMBER OF DISTRIBUTION DESTINATION DEVICES] × [SESSION UPDATE FREQUENCY] | SYSTEM (B), (C), (D) |

FIG.16

| WEB APPLICATION | RELAY SYSTEM (A) | RELAY SYSTEM (B) | RELAY SYSTEM (C) | RELAY SYSTEM (D) |
|---|---|---|---|---|
| host1/path11 | 300,000 | 200,000 | 150,000 | 350,000 |
| host2/path21 | 10,000 | 250,000 | 200,000 | 220,000 |
| host2/path22 | 400,000 | 150,000 | 140,000 | 380,000 |
| host3/ | 100,000 | 300,000 | 200,000 | 250,000 |

FIG.17

| WEB APPLICATION | SELECTION SYSTEM |
|---|---|
| host1/path11 | RELAY SYSTEM (D) |
| host2/path21 | RELAY SYSTEM (B) |
| host2/path22 | RELAY SYSTEM (A) |
| host3/ | RELAY SYSTEM (B) |

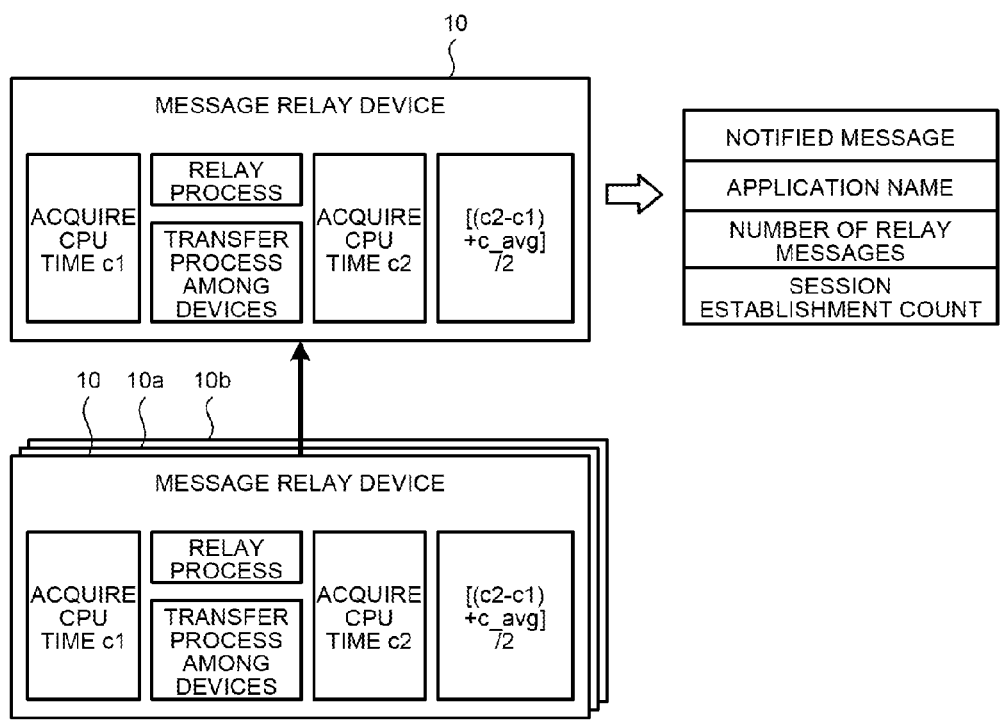

RELAY DEVICE, INFORMATION PROCESSING SYSTEM, AND COMPUTER-READABLE RECORDING MEDIUM

CROSS-REFERENCE TO RELATED APPLICATION

This application is based upon and claims the benefit of priority of the prior Japanese Patent Application No. 2012-062779, filed on Mar. 19, 2012, the entire contents of which are incorporated herein by reference.

FIELD

The embodiments discussed herein are related to a relay device, an information processing system, and a computer-readable recording medium.

BACKGROUND

An information processing system that provides continuous services to clients by establishing sessions with the clients is already known. An information processing system that includes multiple servers, which provide services to clients, and a message relay device, which distributes messages from the clients to each server, is a known example of such an information processing system.

In the following, first, an information processing system that provides a continuous service to a client by establishing a session with the client will be described with reference to FIG. 33. FIG. 33 is a schematic diagram illustrating a process for establishing a session. In the example illustrated in FIG. 33, a client 70 transmits a request message to a server 71.

Then, the server 71 stores therein, in an associated manner, a session ID #12 indicating a session established with the client 70 and session data used to provide a continuous service to the client 70. Then, the server 71 transmits a response message containing therein the created session ID #12 to the client 70.

At this point, the client 70 transmits, to the server 71, a request message that contains the session ID #12 and that is the subsequent message. Then, by using session data #12 that is associated with the session ID #12 contained in the request message, the server 71 transmits a response message to the client 70, thereby providing a continuous service.

In this information processing system, if the number of clients increases, it is difficult to provide a continuous service using a single server. Consequently, there is a known message relay device that distributes the load applied to each server by distributing requests from clients to multiple servers.

In the following, a message relay device that distributes the load applied to each server by distributing requests to multiple servers will be described with reference to FIG. 34. FIG. 34 is a schematic diagram illustrating a technology performed by a message relay device. In the example illustrated in FIG. 34, a message relay device 72 includes message relay information 73, in which a session ID is associated with a server that has established a session. When the message relay device 72 receives a message from a client, the message relay device 72 recognizes, by using the message relay information 73, a server that is associated with the session ID contained in the message and transmits the message to the recognized server.

In the example illustrated in FIG. 34, the message relay device 72 stores therein, in an associated manner, a session ID #11 and an address of the server 71. If the message relay device 72 receives a message containing the session ID #11 from the client 70, the message relay device 72 transfers the message to the server 71, thereby guaranteeing uniqueness of the server to which the message is distributed.

At this point, if the number of servers providing services increases, the processing load applied to the message relay device also increases, which may sometimes cause a bottleneck in the distribution of messages. Consequently, there is a known information processing system in which multiple message relay devices have the same message relay information and distribute messages received from clients to each message relay device.

FIG. 35 is a schematic diagram illustrating an information processing system that includes multiple message relay devices. In the example illustrated in FIG. 35, the information processing system includes the message relay device 72, which stores therein the message relay information 73, and a message relay device 76, which stores therein message relay information 77. Furthermore, the information processing system also includes a load balancer 78 that distributes, in accordance with a Level (L) 3-L4 header, messages from the clients to the message relay devices 72 and 76.

For example, if a session ID contained in a message distributed from the load balancer 78 is not present in the message relay information 73 or if a session ID is not contained in a message, the message relay device 72 transfers the message to an arbitrary server. Then, when the message relay device 72 receives both a response and the session ID from the server to which the message has been transferred by the message relay device 72, the message relay device 72 stores, in an associated manner in the message relay information 73, the session ID and the address of the server to which the message has been transferred.

Furthermore, the message relay device 72 transmits data on the message relay information 73 to the message relay device 76 and synchronizes the message relay information 73 with the message relay information 77. Then, the message relay device 72 transfers the response and the session ID received from the server to the client, which is the issue source of the message, via the load balancer 78. Consequently, because each piece of the message relay information 73 and 77 has the same content, the message relay devices 72 and 76 guarantee the uniqueness with which messages having the same session ID are distributed to the same server.

In the following, the flow of a process, performed by a message relay device, for transferring a response from a server to a client will be described with reference to FIG. 36. FIG. 36 is a flowchart illustrating the flow of an example of a process for transferring a response. For example, a message relay device receives a response (Step S1). Then, the message relay device extracts a session ID from the received response (Step S2) and determines whether the response has a session ID (Step S3).

If the message relay device determines that the response contains the session ID (Yes at Step S3), the message relay device searches for the message relay information by using the session ID as a key (Step S4). Then, the message relay device determines whether a search result contains a hit (Step S5). If the search result contains a hit (Yes at Step S5), the message relay device transfers the response to the client (Step S9).

In contrast, if the search result does not contain a hit (No at Step S5), the message relay device updates the message relay information (Step S6). Then, so that the update result is reflected in the other message relay devices, the message relay device distributes the message relay information to the other message relay devices (Step S7).

Then, the message relay device determines whether the message relay information is distributed to all of the message relay devices (Step S8). If the message relay information is distributed to all of the message relay devices (Yes at Step S8), the message relay device transfers the response to the client (Step S9) and ends the process. If the response does not contain the session ID (No at Step S3), the message relay device transfers the response to the client without updating the message relay information (Step S9) and ends the process.

Patent Document 1: Japanese Laid-open Patent Publication No. 2003-296289

Patent Document 2: Japanese Laid-open Patent Publication No. 2000-090024

However, with the technology in which each message relay device synchronizes message relay information, a message is transferred to a client after synchronizing the message relay information stored in each of the message relay devices every time a new session is established. Consequently, if a session of a service provided to the client is more frequently updated, the message relay devices need to more frequently synchronize the message relay information, thus reducing the throughput and performance of the information processing system, which is a problem.

To improve the throughput of the message relay devices, it may also be possible to use a method in which multiple message relay devices store therein message relay information by dividing the information into multiple pieces. For example, the message relay devices each store therein different pieces of message relay information each piece of which contains a different session ID. If a session ID of a received message is not contained in its own message relay information, the message relay device transfers the message to another message relay device and the message is transferred to the server from the message relay device that corresponds to the transfer destination. Alternatively, it may also be possible to use a method in which a message relay device identifies the destination server by sending, to another message relay device, a query about a server that is associated with the session ID of the message.

However, if the size of a message is large, the processing load at the time of message transmission increases. Consequently, with the method in which multiple message relay devices store therein information by dividing the information into multiple pieces, if the size of a message is large, the throughput of a message relay device decreases, thus reducing the performance of the information processing system.

SUMMARY

According to an aspect of an embodiment, a relay device includes a memory and a processor coupled to the memory. The processor executes a process including storing association relationship information in which a session identifier for identifying a session established between a server and a client by a program running on the server is associated with a server identifier for identifying the server to the memory. The process includes determining whether a session identifier contained in a message received from a distributing device is contained in the association relationship information stored at the storing. The process includes selecting, when it is determined at the determining that the session identifier contained in the received message is not contained in the association relationship information, a relay system used when the received message is transferred to the server in accordance with a program that has established a session indicated by the session identifier contained in the message. The process includes transferring the message by using the relay system selected at the selecting.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 is a table illustrating the update frequency of a session performed by each service;

FIG. 3 is a schematic diagram illustrating a relay method of a message;

FIGS. 5A and 5B are schematic diagrams illustrating the functional configuration of the message relay device according to the first embodiment;

FIG. 6 is a schematic diagram illustrating an example of a system selection table;

FIG. 7 is a schematic diagram illustrating an example of message relay information;

FIG. 8 is a schematic diagram illustrating an example of a message relay device list;

FIG. 9 is a schematic diagram illustrating an example of a resource consumption DB;

FIG. 14 is a schematic diagram illustrating an example of the amount of resources;

FIG. 15 is a schematic diagram illustrating an example of the amount of resources needed for distributing message relay information;

FIG. 16 is a schematic diagram illustrating an example of predicted values of throughput;

FIG. 17 is a schematic diagram illustrating an example of relay systems selected by the relay system determining unit;

FIG. 30 is a schematic diagram illustrating a process performed when a single message relay device is used as a sampling node;

FIG. 31 is a schematic diagram illustrating an example of already-established session information;

DESCRIPTION OF EMBODIMENTS

Preferred embodiments of the present invention will be explained with reference to accompanying drawings.

[a] First Embodiment

Figure 1:
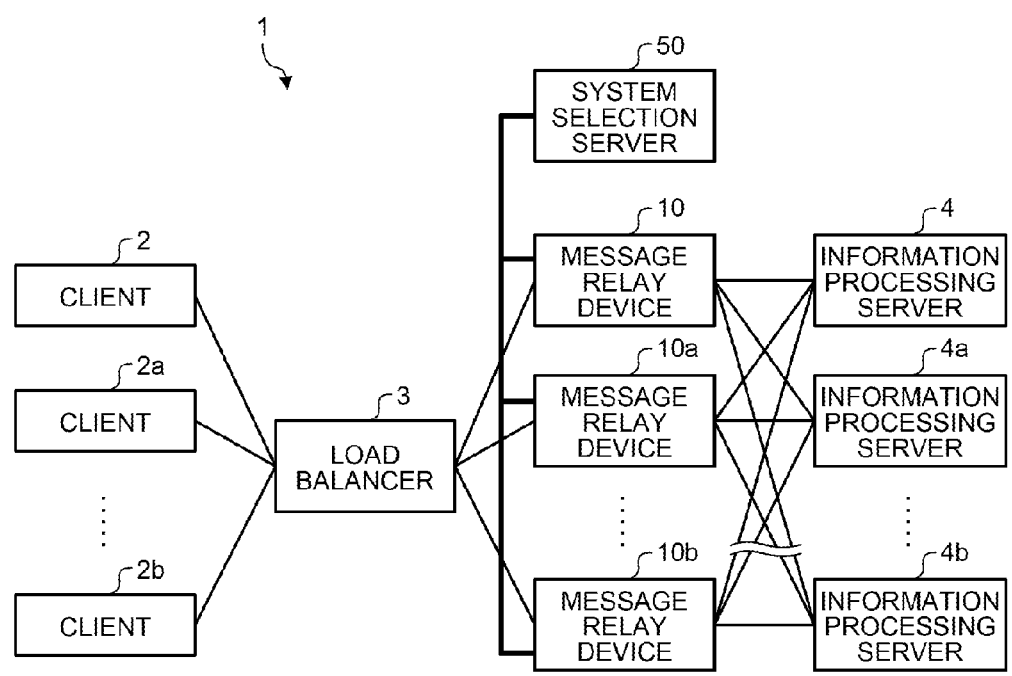
FIG. 1 is a schematic diagram illustrating an information processing system according to a first embodiment.

In a first embodiment described below, an example of an information processing system according to the first embodiment will be described with reference to FIG. 1. FIG. 1 is a schematic diagram illustrating an information processing system according to a first embodiment. In the example illustrated in FIG. 1, an information processing system 1 includes multiple clients 2 to 2b, a load balancer 3, multiple information processing servers 4 to 4b, multiple message relay devices 10 to 10b, and a system selection server 50.

Furthermore, in the example illustrated in FIG. 1, each of the clients 2 to 2b is connected to the load balancer 3; the load balancer 3 is connected to each of the message relay devices 10 to 10b; and each of the message relay devices 10 to 10b is connected to the system selection server 50. Furthermore, each of the message relay devices 10 to 10b is connected to each of the information processing servers 4 to 4b.

The example in FIG. 1 is illustrated using the clients 2 to 2b; however, in the information processing system 1, an arbitrary number of clients may also be connected. Furthermore, the example in FIG. 1 is illustrated using the message relay devices 10 to 10b and the information processing servers 4 to 4b; however, the embodiment is not limited thereto. For example, in the information processing system 1, an arbitrary number of message relay devices and information processing servers may also be arranged.

In the following, a process performed by the client 2, the load balancer 3, the information processing server 4, the message relay device 10, and the system selection server 50 will be described. The clients 2a and 2b each have the same function as that performed by the client 2; therefore, descriptions thereof will be omitted. Furthermore, the information processing servers 4a and 4b each have the same function as that performed by the information processing server 4; therefore, descriptions thereof will be omitted. Furthermore, the message relay devices 10a and 10b each have the same function as that performed by the message relay device 10; therefore, descriptions thereof will be omitted.

The client 2 is a user terminal that establishes a session with, for example, a web application executed by one of the information processing servers 4 to 4b and that receives a continuous service. For example, the client 2 issues a message that requests a service to be provided and transmits the message to the load balancer 3. Furthermore, the client 2 stores therein a session ID that is contained in a response with respect to the message. The session ID mentioned here is an identifier indicating an established session.

If the client 2 requests a continuous service, the client 2 stores, in the message to be transmitted, the stored session ID. Then, the client 2 transmits the message containing the session ID to the load balancer 3.

When the load balancer 3 receives messages from the clients 2 to 2b, the load balancer 3 sends the messages to one of the message relay devices by using Layer (L) 3 and Layer (L) 4 information on the received message. For example, the load balancer 3 identifies a Transmission Control Protocol (TCP)/IP header of a received message and sends the message to one of the message relay devices 10 to 10b in accordance with the source IP address, the source port number, the destination IP address, and the destination port number of the identified TCP/IP header. Furthermore, when the load balancer 3 receives a response from one of the message relay devices 10 to 10b, the load balancer 3 transfers the received response to the client, from the clients 2 to 2b, that has issued a request.

In this way, the load balancer 3 distributes messages issued by the clients 2 to 2b to the message relay devices 10 to 10b without referring to session IDs. Accordingly, each of the message relay devices 10 to 10b does not always receive a request message containing the same session ID. Consequently, each of the message relay devices 10 to 10b needs to have a function of retaining the identity of the destination information processing server to which request messages having the same session ID are to be distributed.

The information processing server 4 executes a program that provides a continuous service to the clients 2 to 2b. For example, when the information processing server 4 receives a message that does not contain a session ID from one of the message relay devices 10 to 10b, the information processing server 4 provides a first service. Specifically, if the program executed by the information processing server 4 continues providing the service, the information processing server 4 creates a new session ID and stores therein, in an associated manner, the created session ID and information related to the provided service.

Then, the information processing server 4 stores the created session ID in a response and transmits the response to, the message relay device, from the message relay devices 10 to 10b, that has transmitted the message. The response, in which the session ID is contained, is transferred to the client that has issued the message via the subject message relay device and the load balancer 3.

Furthermore, if a predetermined condition is satisfied, the program executed by the information processing server 4 updates a session. For example, for a service provided to the client 2, when a message is received, if a predetermined time has elapsed after a previous message is received, the program executed by the information processing server 4 determines to update the session. Then, the program executed by the information processing server 4 creates a new session ID and transmits a response by containing the new session ID.

In the following, the update frequency of a session executed by the program executed by the information processing server 4, i.e., the session update frequency of each service, will be described with reference to FIG. 2. FIG. 2 is a table illustrating the update frequency of a session performed by each service. FIG. 2 illustrates, as an example of a service provided by the information processing server 4, the services of each site, which are provided via web sites. Specifically, in the example illustrated in FIG. 2, the categories of the service provided by each site, viewers of each site, page views for each site, and update frequency of a session for each site are associated with each other, in ascending order of the number of viewers per site.

The update frequency is a value obtained by calculating such that ten requests are issued when a single web page is acquired, one single session is established every time a user logs in, and each user logs in once a day. Consequently, for example, the session of the site "aaa.com" is updated once every time the number of issued requests reaches "351".

Furthermore, for example, the session of the site "fff.com" is updated once every time the number of issued requests reaches "4". Furthermore, the session of the site "lll.com" is updated once every time the number of issued requests reaches "472". In this way, the information processing server 4 updates sessions at a different frequency for each service provided to each of the clients 2 to 2b.

A description will be given here by referring back to FIG. 1. The message relay device 10 stores therein message relay information in which a session ID is associated with an address of a server that provides a service for a session that has been established. Furthermore, when the message relay device 10 receives a message from the load balancer 3, the message relay device 10 analyzes the received message and acquires the stored session ID. Then, the message relay device 10 determines whether the acquired session ID is contained in the message relay information.

If the acquired session ID is contained in the message relay information, the message relay device 10 transfers the message to the server having the address that is associated with the acquired session ID. In contrast, if the acquired session ID is not contained in the message relay information, the message relay device 10 selects a relay system for the message in accordance with the update frequency of the session of the service in which the session indicated by the acquired session ID has been established.

Specifically, the message relay device 10 acquires a relay system for the message selected by the system selection server 50 in accordance with the update frequency of the session of the service. Then, the message relay device 10 transfers the message using the acquired relay system.

In the following, relay systems for transferring a message performed by the message relay device 10 will be described with reference to FIG. 3. FIG. 3 is a schematic diagram illustrating a relay method of a message. As illustrated in FIG. 3, the message relay device 10 relays a message by using one of four relay methods, i.e., relay systems (A) to (D).

In the following, each of the relay systems (A) to (D) will be described. For example, the relay system (A) uses a relay system that synchronizes message relay information in each of the message relay devices 10 to 10b every time a piece of message relay information is updated. In the relay system (A), the message relay information stored in each of the message relay devices 10 to 10b is synchronized. Accordingly, even when the load balancer 3 sends a message to any one of the message relay devices 10 to 10b, the one of the message relay devices 10 to 10b transfers the message to one of the information processing servers 4 to 4b without processing anything.

Consequently, the relay system (A) can reduce the amount of resources consumed when a message is relayed to a server. Furthermore, in the relay system (A), even if the load of the message relay process is large due to a large size message, the effect with respect to the throughput can be reduced compared with the other relay systems (B) to (D).

However, in the relay system (A), if a new session is established or if a session is updated, when a response containing a new session ID is received, the relay system (A) synchronizes the message relay information stored in each of the message relay devices 10 to 10b. Accordingly, in the relay system (A), the amount of resources consumed when a session is updated increases compared with the other relay systems (B) to (D).

The relay system (B) is a relay system in which the message relay devices 10 to 10b each have different message relay information. For example, session IDs are previously distributed to the message relay devices 10 to 10b by using, for example, a hash calculation. Then, each of the message relay devices 10 to 10b stores therein message relay information containing a distributed session ID.

For example, the message relay device 10 receives, from the client 2, a message containing a session ID that has not been distributed to the message relay device 10. Then, the message relay device 10 identifies, by using the a hash calculation or the like, the message relay device to which the session ID of the received message has been sent, for example, the message relay device 10a.

Then, the message relay device 10 transfers the message to the identified message relay device 10a. The message relay device 10a transmits the message to a server by using the message relay information stored in the message relay device 10a and transfers a response received from the server to the message relay device 10. Then, the message relay device 10 transmits the response received from the message relay device 10a to the client 2.

Consequently, in the relay system (B), the message relay information stored in each of the message relay devices 10 to 10b does not need to be synchronized; therefore, the amount of resources consumed at the time of a session update can be reduced compared with the relay system (A). However, the relay system (B) identifies a message relay device to which a session ID has been distributed by using, for example, a hash calculation and transmits and receives a message and a response via the identified message relay device. Accordingly, in the relay system (B), the amount of resources consumed when a message is relayed increases and the effect when the load of the message relay process increases is large compared with the relay system (A).

Similarly to the relay system (B), the relay system (C) is a relay system in which session IDs are previously distributed to the message relay devices 10 to 10b. Furthermore, the relay system (C) is a relay system in which, if a session ID of a received message is not contained in the message relay information stored in the message relay device 10, the message relay device 10 sends a query about a server, i.e., the transfer destination of the message, to the message relay device to which the session ID has been distributed.

For example, if the session ID of the received message is not contained in the message relay device 10, the message relay device 10 identifies a message relay device to which the session ID has been distributed by using, for example, a hash calculation. Then, the message relay device 10 notifies the identified message relay device of the session ID and acquires, from the identified message relay device, the address of the server that is associated with the session ID. Then, the message relay device 10 transmits the received message to the server having the acquired address.

Consequently, in the relay system (C), the amount of resources consumed at the time of a session update is reduced compared with the relay system (A). Furthermore, in the relay system (C), because a message is not transferred, the effect when the load of the message relay process increases can be reduced compared with the relay system (B). However, in the relay system (C), because a hash calculation or the like is performed when a message is relayed, the amount of resources consumed when the message is relayed increases compared with the relay system (A).

Furthermore, similarly to the relay system (C), the relay system (D) is a system that sends a query about a server corresponding to the transfer destination of a message to the other message relay devices. Furthermore, in the relay system (D), each of the message relay devices 10 to 10b caches, in an associated manner in its own message relay information, the address of the server, which is acquired in response to the query sent to the other message relay devices, and the session ID of the received message.

Accordingly, when re-receiving a message containing the same session ID, each of the message relay devices 10 to 10b transfers the message to a server without querying the other message relay devices. Consequently, similarly to the relay system (C), in the relay system (D), it is possible to reduce both the amount of resources consumed at the time of a session update and the effect when the load of the message relay process increases compared with the other relay systems. However, in the relay system (D), the amount of resources consumed when a message is relayed increases compared with the relay system (A).

As described above, in the relay systems (A) to (D), the amount of resources consumed when a message is relayed, the amount of resources consumed when a session is updated, and the effect when the load applied to the message relay device 10 increases differ. Accordingly, the message relay device 10 transfers a message by using one of the relay systems (A) to (D) for each service in which a session indicated by a session ID is established. Specifically, the message relay device 10 relays a message by using a relay system selected, for each service, by the system selection server 50.

The system selection server 50 receives, from the message relay devices 10 to 10b, a notification indicating the amount of resources needed for the update frequency of a session and message relay information are synchronized. Furthermore, the system selection server 50 receives a notification indicating the amount of resources consumed when a message is transferred to another relay device and the amount of resources consumed when a query is sent to a server. Then, by using the received update frequency or the amount of resources and by using one of the relay systems (A) to (D), the system selection server 50 calculates the throughput obtained when a message is transferred. Then, the system selection server 50 notifies the message relay devices 10 to 10b of the relay system having the largest throughput.

Figure 4:
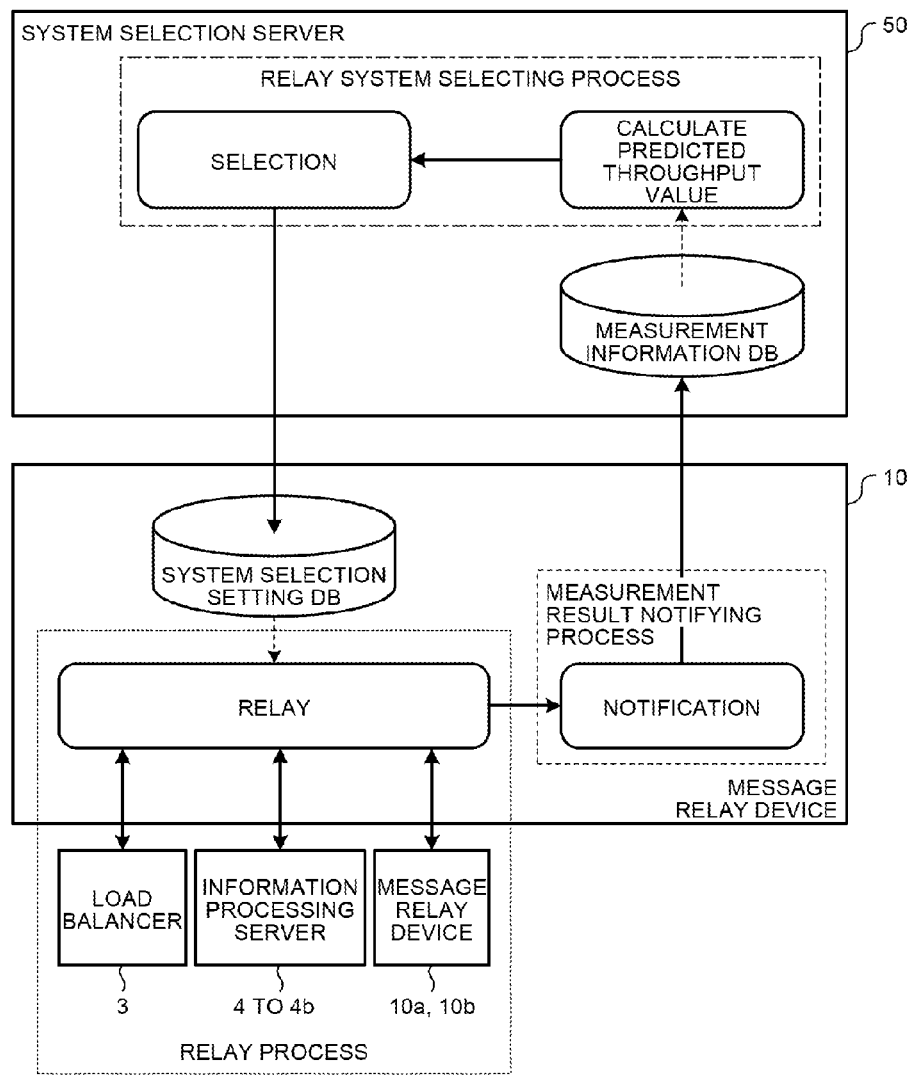
FIG. 4 is a schematic diagram illustrating a process performed by a message relay device and a system selection server according to the first embodiment.

In the following, a process performed by the message relay device 10 and the system selection server 50 will be described with reference to FIG. 4. FIG. 4 is a schematic diagram illustrating a process performed by a message relay device and a system selection server according to the first embodiment. First, the message relay device 10 performs a relay process on a message or a response. Furthermore, the message relay device 10 synchronizes the message relay information with the message relay devices 10a and 10b or sends a query about a transfer destination server to the message relay devices 10a and 10b.

Furthermore, the message relay device 10 performs a measurement result notifying process by measuring the amount of resources consumed in each of the relay processes and notifying the system selection server 50 of the measurement result. Then, the system selection server 50 stores the measurement result of which it was notified by the message relay device 10 in a measurement information database (DB). Thereafter, by using the measurement result stored in the measurement information DB, the system selection server 50 performs a relay system selecting process by calculating the predicted value of the throughput and selecting a relay system in which the calculated predicted value of the throughput is the largest.

Then, the system selection server 50 notifies the message relay device 10 of the selected relay system. Then, the message relay device 10 stores the notified relay system in a system selection setting DB. Then, the message relay device 10 relays a message by using the relay system stored in the system selection setting DB.

Figure 5A:
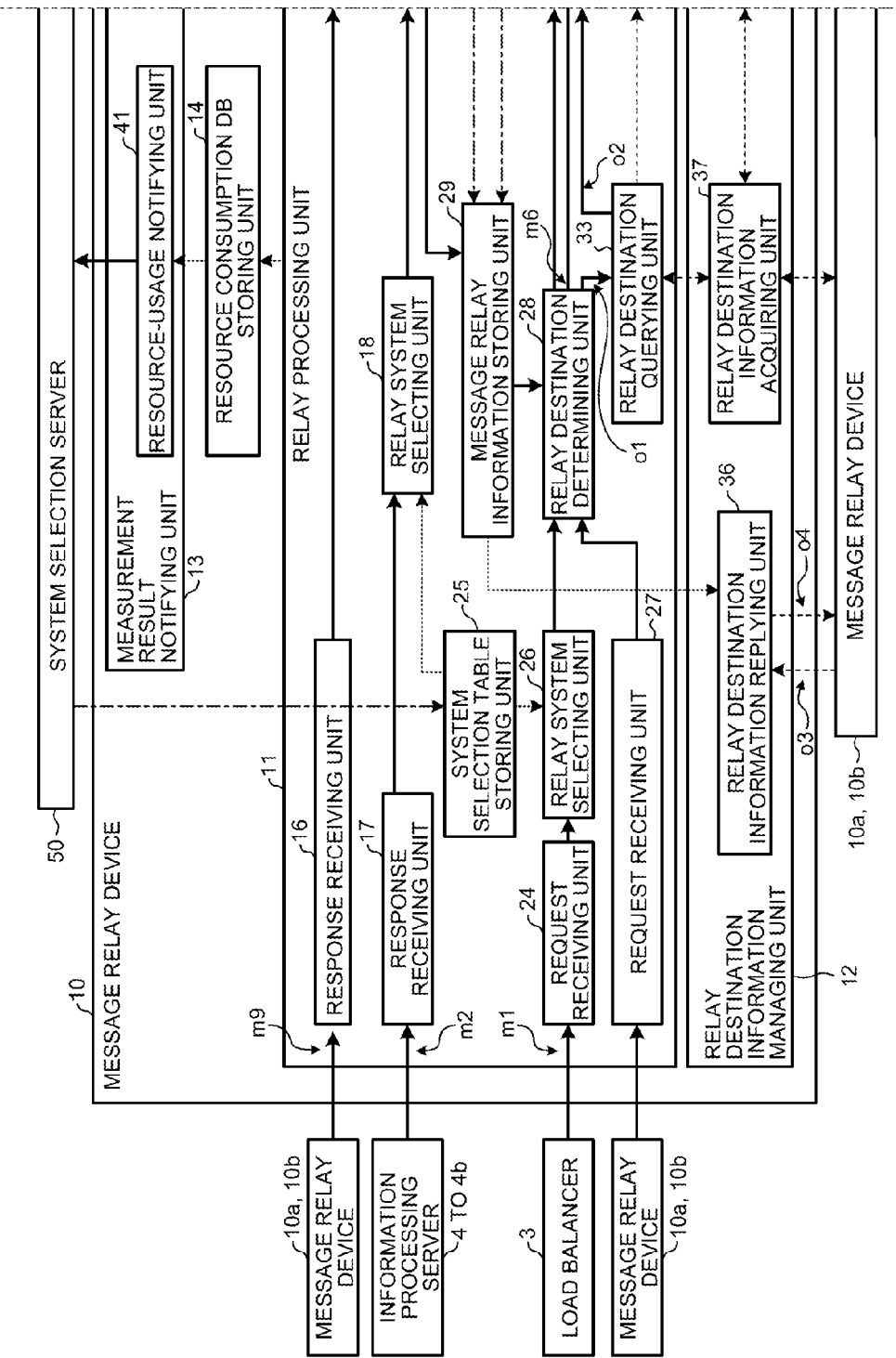

In the following, the functional configuration of the message relay device 10 will be described with reference to FIGS. 5A and 5B. FIGS. 5A and 5B are schematic diagrams illustrating the functional configuration of the message relay device according to the first embodiment. In the example illustrated in FIGS. 5A and 5B, the message relay device 10 includes a relay processing unit 11, a relay destination information managing unit 12, a measurement result notifying unit 13, a resource consumption DB storing unit 14, and a session-update frequency-calculation counting unit 15. Furthermore, the relay processing unit 11 includes a response receiving unit 16, a response receiving unit 17, a relay system selecting unit 18, a new-session identifying unit 19, a new-session counter updating unit 20, and a message process counter updating unit 21.

The relay processing unit 11 includes a response transmitting unit 22, a destination device transferring unit 23, a request receiving unit 24, a system selection table storing unit 25, a relay system selecting unit 26, a request receiving unit 27, a relay destination determining unit 28, a message relay information storing unit 29, and a request transferring unit 30. Furthermore, the relay processing unit 11 includes a transfer destination querying unit 31, a destination device transferring unit 32, a relay destination querying unit 33, a cache 34, and a message relay device list storing unit 35.

The relay destination information managing unit 12 includes a relay destination information replying unit 36, a relay destination information acquiring unit 37, a relay destination information retaining device searching unit 38, a table distributing unit 39, and a table updating unit 40. The measurement result notifying unit 13 includes a resource-usage notifying unit 41 and a session update frequency notifying unit 42. First, in the following, a description will be given of an example of a system selection table stored in the system selection table storing unit 25, request relay information stored in the message relay information storing unit 29, and a message relay device list stored in the message relay device list storing unit 35.

FIG. 6 is a schematic diagram illustrating an example of a system selection table. As illustrated in FIG. 6, the system selection table storing unit 25 stores therein a system selection table in which a uniform resource locator (URL) of a web service provided by each of the information processing servers 4 to 4*b* is associated with a relay system. In the example illustrated in FIG. 6, the system selection table storing unit 25 stores therein, in an associated manner, the URL "AAA.com" and the "system (A)". Instead of storing an URL, the system selection table storing unit 25 may also stores therein the name of the web application that provides a service.

FIG. 7 is a schematic diagram illustrating an example of message relay information. As illustrated in FIG. 7, the message relay information storing unit 29 stores therein message relay information, in which a session ID is associated with a message transfer destination address. The message transfer destination address mentioned here is an address of a server that provides a service for a session indicated by the associated session ID that has been established. In the example illustrated in FIG. 7, the message relay information storing unit 29 stores therein, in an associated manner, the session ID "55D95DFF . . . " and the message transfer destination address "192.168.1.4", which is the Internet Protocol (IP) address of the information processing server 4.

FIG. 8 is a schematic diagram illustrating an example of a message relay device list. As illustrated in FIG. 8, the message relay device list storing unit 35 stores therein, in an associated manner, the device number of each of the message relay devices 10 to 10*b* and the address of each of the message relay devices 10 to 10*b*. For example, in the example illustrated in FIG. 8, the message relay device list storing unit 35 stores therein, in an associated manner, "1", which is the device number of the message relay device 10*a*, and "192.168.0.2", which is the IP address of the message relay device 10*a*.

In the following, a resource consumption DB stored in the resource consumption DB storing unit 14 and information stored in the session-update frequency-calculation counting unit 15 will be described with reference to FIGS. 9 and 10. First, the resource consumption DB stored in the resource consumption DB storing unit 14 will be described with reference to FIG. 9.

FIG. 9 is a schematic diagram illustrating an example of a resource consumption DB. In the example illustrated in FIG. 9, the resource consumption DB storing unit 14 stores therein a resource consumption DB in which the URL of a web service, a message relay resource amount, a message transfer resource amount, a message-relay-information query resource amount, and a message-relay-information distribution resource amount are associated with each other.

Here, the message relay resource amount is the amount of resources consumed during the message relay process that relays a message to the information processing servers 4 to 4*b*. The message transfer resource amount is the amount of resources consumed when a message is transferred among the message relay devices 10 to 10*b*. The message-relay-information query resource amount is the amount of resources consumed when the message relay device 10 sends a query about a server, which corresponds to the transfer destination of a message, to the other message relay devices 10*a* and 10*b*.

The message-relay-information distribution resource amount is the amount of resources consumed when message relay information is synchronized across the message relay devices 10 to 10*b*. Each of the amounts of resources is represented by, for example, the CPU time used when each process is executed. In the example illustrated in FIG. 9, the resource consumption DB storing unit 14 stores therein an entry in which the URL "AAA.com", the message relay resource amount "0:00:01", and the message-relay-information distribution resource amount "0:00:08" are associated with each other.

In the following, the information stored in the session-update frequency-calculation counting unit 15 will be described with reference to FIG. 10. FIG. 10 is a schematic diagram illustrating an example of a session update frequency calculation counter. As illustrated in FIG. 10, the session-update frequency-calculation counting unit 15 stores therein information, in which an URL that provides a service, a message processing count, and a session establishment count are associated with each other.

Here, the message processing count is the number of times messages associated with the URL are processed and is incremented every time a response to a message associated with the URL is received. The session establishment count is the number of times sessions are established in a service provided by the associated URL. For example, in the example illustrated in FIG. 10, for the service provided by the URL "AAA.com", the session-update frequency-calculation counting unit 15 stores therein information indicating that the number of messages processed is "257" and the number of times the session is established is "1".

A description will be given here by referring back to FIGS. 5A and 5B. The response receiving unit 16 receives responses transferred from the message relay devices 10*a* and 10*b*. Specifically, by using the relay system (B), the response receiving unit 16 receives a response to a message that has been transferred to the other message relay devices 10*a* and 10*b*. Then, the response receiving unit 16 transfers the response to the response transmitting unit 22. Furthermore, the response receiving unit 17 receives a response to a message from one of the information processing servers 4 to 4*b*. Specifically, the response receiving unit 17 receives a response to a message that has been directly transferred, by the message relay device 10, to one of the information processing servers 4 to 4*b*. Then, the response receiving unit 17 transfers the received response to the relay system selecting unit 18.

When the relay system selecting unit 18 receives a response from the response receiving unit 17, the relay system selecting unit 18 extracts a session ID contained in the received response and specifies a service in which a session indicated by the extracted session ID has been established. Then, the relay system selecting unit 18 specifies, from the system selection table stored in the system selection table storing unit 25, a relay system that is associated with the specified service. Thereafter, the relay system selecting unit 18 notifies the new-session identifying unit 19 of the received response and the specified relay system.

The new-session identifying unit 19 receives the response and the relay system from the relay system selecting unit 18. Then, the new-session identifying unit 19 extracts the session ID from the received response and determines whether the session specified by the extracted session ID is a new session. Specifically, the new-session identifying unit 19 extracts the session ID from the response and identifies the information processing server that corresponds to the issue source of the response. Then, the new-session identifying unit 19 determines whether the message relay information storing unit 29 stores therein request relay information, in which the extracted session ID is associated with the address of the identified information processing server.

Then, if the message relay information storing unit 29 stores therein the request relay information, in which the extracted session ID is associated with the address of the identified information processing server, the new-session identifying unit 19 determines that the extracted session ID is the session ID of the existing session. Then, the new-session identifying unit 19 transmits the response to the message process counter updating unit 21.

Furthermore, if the message relay information storing unit 29 does not store therein the request relay information, in which the extracted session ID is associated with the address of the identified information processing server, the new-session identifying unit 19 determines whether the extracted session ID is a new session ID. Then, the new-session identifying unit 19 adds an entry, in which the session ID extracted from the response is associated with the address of the identified information processing server, to the request relay information.

Furthermore, if the relay system notified by the relay system selecting unit 18 is the relay system (A), the new-session identifying unit 19 notifies the table distributing unit 39 of both the session ID contained in the response and the address of the server that corresponds to the issue source of the response. Then, the new-session identifying unit 19 transmits the response to the new-session counter updating unit 20.

When the new-session counter updating unit 20 receives the response from the new-session identifying unit 19, the new-session counter updating unit 20 identifies, by using the session ID contained in the response, the service that has issued the response. Then, from among the session establishment counts stored in the session-update frequency-calculation counting unit 15, the new-session counter updating unit 20 increments the value of the session establishment count that is associated with the identified service by one. Then, the new-session counter updating unit 20 transmits the response to the message process counter updating unit 21.

When the message process counter updating unit 21 receives the response from the new-session identifying unit 19 or the new-session counter updating unit 20, the message process counter updating unit 21 identifies, by using the session ID contained in the response, the service that has issued the response. Then, from among the message processing counts stored in the session-update frequency-calculation counting unit 15, the message process counter updating unit 21 increments the value of the message processing count associated with the identified service by one.

If the received response is the response to the message that is relayed by the message relay device 10 to one of the information processing servers 3 to 3b, the message process counter updating unit 21 outputs the received response to the response transmitting unit 22. In contrast, if the received response is the response to the message that is transferred from one of the other message relay devices 10a and 10b, the message process counter updating unit 21 transmits the response to the destination device transferring unit 23.

When the response transmitting unit 22 receives the response from the response receiving unit 16 or the message process counter updating unit 21, the response transmitting unit 22 transmits the received response to the load balancer 3. Furthermore, when the destination device transferring unit 23 receives the response from the message process counter updating unit 21, the destination device transferring unit 23 transfers the response to one of the message relay devices 10a and 10b that is the transfer source of the message with respect to the received response.

The request receiving unit 24 receives a message that is allocated to the message relay device 10 by the load balancer 3. Then, the request receiving unit 24 transmits the received request to the relay system selecting unit 26.

Figures 10, 11:
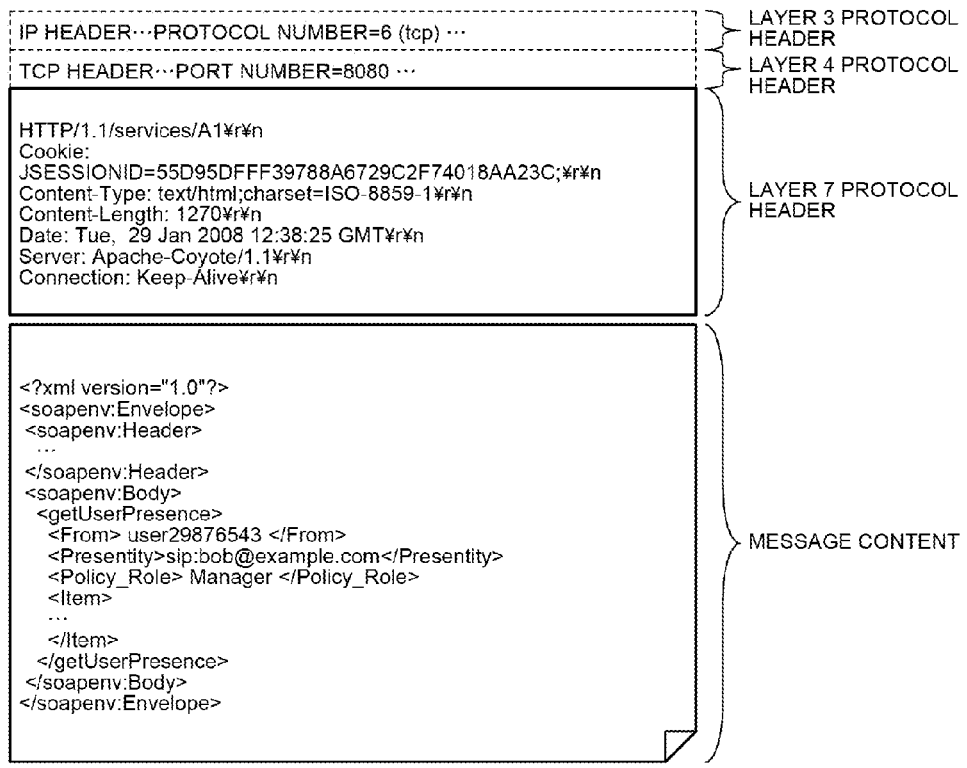
FIG. 10 is a schematic diagram illustrating an example of a session update frequency calculation counter.
FIG. 11 is a schematic diagram illustrating an example of a message according to the first embodiment.

FIG. 11 is a schematic diagram illustrating an example of a message according to the first embodiment. As illustrated in FIG. 11, the request receiving unit 24 receives a message containing a layer 3 protocol header, a layer 4 protocol header, a layer 7 protocol header, and message content.

The layer 3 protocol header is, for example, an IP header and stores therein a protocol number, a destination IP address, or the like. The layer 4 protocol header is, for example, a TCP header and stores therein a port number or the like. The layer 7 protocol header is, for example, a Hyper Text Transfer Protocol (HTTP) header and stores therein information on a Cookie or the like. The message content is, for example, a Simple Object Access Protocol (SOAP) header, a body, and the like.

In the example illustrated in FIG. 11, JSESSIONID, which is a session ID, is stored in the Cookie in the layer 7 protocol header. The message relay device 10 extracts JSESSIONID stored in the layer 7 and specifies, by using the extracted JSESSIONID, an information processing server that corresponds to the transfer destination of the message. Furthermore, by using the IP address stored in the layer 3 protocol header, the message relay device 10 specifies a service provided to the client that corresponds to the issue source of the message.

A description will be given here by referring back to FIGS. 5A and 5B. When the relay system selecting unit 26 receives a request from the request receiving unit 24, the relay system selecting unit 26 extracts the destination URL contained in the request or extracts the name of the web application that provides the service. Then, the relay system selecting unit 26 identifies the relay system that is associated with the extracted URL from the system selection table. Thereafter, the relay system selecting unit 26 outputs the request to the relay destination determining unit 28 and notifies the relay destination determining unit 28 of the identified relay system.

In contrast, if the relay system associated with the extracted URL or the web application name is not present in the system selection table stored in the system selection table storing unit 25, the relay system selecting unit 26 notifies the relay destination determining unit 28 that the extracted relay system has not been determined. Furthermore, the relay system selecting unit 26 outputs the request to the relay destination determining unit 28.

The request receiving unit 27 receives the request that has been transferred to the message relay device 10 by one of the other message relay devices 10a and 10b. Specifically, the request receiving unit 27 receives the request that is relayed by using the relay system (B). Then, the request receiving unit 27 outputs the received request to the relay destination determining unit 28.

If the relay destination determining unit 28 receives a notification indicating a relay system together with the request from the relay system selecting unit 26, the relay destination determining unit 28 executes the following process. First, the relay destination determining unit 28 searches for the message relay information storing unit 29 for the address of the server that is associated with the session ID contained in the request. Then, if the address of the server associated with the session ID contained in the request contains a hit, the relay destination determining unit 28 outputs both the hit address and the request to the request transferring unit 30.

In contrast, if the address of the server associated with the session ID contained in the request does not contain a hit, the relay destination determining unit 28 executes the following process in accordance with the relay system indicated by the notification. First, if the relay system indicated by the notification is the relay system (B), the relay destination determining unit 28 outputs the received message to the transfer destination querying unit 31. Furthermore, if the relay system indicated by the notification is the relay system (C) or the relay system (D), the relay destination determining unit 28 outputs the received message and the relay system to the relay destination querying unit 33.

At this point, in the relay destination determining unit 28, if the relay system indicated by the notification is the relay system (A), the address of the server associated with the session ID contained in the request always contains a hit. Accordingly, the relay destination determining unit 28 outputs the address of the searched server and the received message to the request transferring unit 30. Furthermore, if the relay destination determining unit 28 receives the request from the relay system selecting unit 26 and also receives a notification indicating that a relay system has not been determined, the request transferring unit 30 outputs the request and notifies the request transferring unit 30 that a relay system has not been determined.

When the request transferring unit 30 receives the address of the server and the message from the relay destination determining unit 28, the request transferring unit 30 transmits the message to the information processing server having the received address out of the information processing servers 4 to 4b. Furthermore, when the request transferring unit 30 receives the address of the server and the message from the relay destination querying unit 33, the request transferring unit 30 transmits the message to the information processing server having the received address out of the information processing servers 4 to 4b.

When the transfer destination querying unit 31 receives the message from the relay destination determining unit 28, the transfer destination querying unit 31 queries a message relay device that corresponds to the transfer destination of the message. In other words, the transfer destination querying unit 31 queries the transfer destination of the message that is to be transferred by using the relay system (B). Specifically, the transfer destination querying unit 31 extracts the session ID from the received message and outputs the extracted session ID to the relay destination information retaining device searching unit 38.

At this point, when the session ID is received, the relay destination information retaining device searching unit 38 determines which message relay devices 10a and 10b stores therein the server address that is associated with the session ID and notifies the transfer destination querying unit 31 of the determined message relay device. For example, values 0 to N are given to the every message relay devices 10 to 10b.

When the session ID is received from the transfer destination querying unit 31, the relay destination information retaining device searching unit 38 obtains a value of the remainder by converting the received session ID into numbers by using a hash function and by calculating by dividing the converted value by N+1. Then, the relay destination information retaining device searching unit 38 acquires, from the message relay device list storing unit 35, the address of the message relay device that is associated with the calculated remainder and notifies the transfer destination querying unit 31 of the acquired address.

Then, the transfer destination querying unit 31 outputs, to the destination device transferring unit 32, both the address indicated in the notification from the relay destination information retaining device searching unit 38 and the message received from the relay destination determining unit 28. Then, the destination device transferring unit 32 transfers the message to the message relay device 10a or 10b having the received address.

When the relay destination querying unit 33 receives the message from the relay destination determining unit 28, the relay destination querying unit 33 extracts the session ID from the received message and notifies the relay destination information acquiring unit 37 of the extracted session ID. In such a case, the relay destination information acquiring unit 37 acquires the server address that is associated with the session ID from one of the other message relay devices and notifies the relay destination querying unit 33 of the acquired server address.

Then, the relay destination querying unit 33 transmits the acquired server address and the message to the request transferring unit 30. Furthermore, if the relay system indicated by the notification is the relay system (D), the relay destination querying unit 33 stores, in an associated manner in the cache 34, the acquired server address and the session ID that is extracted from the message. Then, the server address and the session ID stored in the cache 34 is added to the request relay information that is stored in the message relay information storing unit 29.

The relay destination information replying unit 36 receives a search request for a server address from the other message relay device 10a or 10b. At this point, a session ID is contained in the search request for the server address. When the relay destination information replying unit 36 receives the search request for the server address, the relay destination information replying unit 36 extracts the session ID contained in the received search request and searches the request relay information for the server address that is associated with the extracted session ID. Then, the relay destination information replying unit 36 notifies the message relay device 10a or 10b, which corresponds to the transmission source of the search request, of the searched server address.

When the relay destination information acquiring unit 37 receives the session ID from the relay destination querying unit 33, the relay destination information acquiring unit 37 outputs the received session ID to the relay destination information retaining device searching unit 38. In such a case, the relay destination information retaining device searching unit 38 executes the same process as that performed when the session ID is received from the transfer destination querying unit 31 and then outputs, to the relay destination information acquiring unit 37, the address of the message relay device that stores therein the server address associated with the session ID.

Then, the relay destination information acquiring unit 37 transmits the search request for the server address containing the session ID to the message relay device having the received address. When the relay destination information acquiring unit 37 receives the server address from the message relay device that has transmitted the search request, the relay destination information acquiring unit 37 notifies the relay destination querying unit 33 of the received server address.

When the relay destination information retaining device searching unit 38 receives the session ID from the transfer destination querying unit 31 or the relay destination information acquiring unit 37, the relay destination information retaining device searching unit 38 searches the message relay device list for the address of the message relay device that stores therein the server address that is associated with the received session ID. Then, the relay destination information retaining device searching unit 38 outputs the address of the message relay device, which is the search result, to the transfer destination querying unit 31 and the relay destination information acquiring unit 37.

Furthermore, when the relay destination information retaining device searching unit 38 receives, from the table distributing unit 39, a query about the destination of the request relay information, the relay destination information retaining device searching unit 38 acquires the address of each of the message relay devices 10a and 10b from the message relay process list. Then, the relay destination information retaining device searching unit 38 notifies the table distributing unit 39 of the acquired address.

When the table distributing unit 39 receives, from the new-session identifying unit 19, the session ID contained in the response and the address of the server that corresponds to the issue source of the response, the table distributing unit 39 outputs a query about the distribution destination of the message relay destination information to the relay destination information retaining device searching unit 38. If the table distributing unit 39 acquires the address of each of the message relay devices 10a and 10b, the table distributing unit 39 distributes the entry, in which the session ID is associated with the address of the server and which is received from the new-session identifying unit 19, to the message relay devices 10a and 10b.

When the table updating unit 40 receives the entry, in which the session ID is associated with the address of the server, from the other message relay device 10a or 10b, the table updating unit 40 adds the received entry to the request relay information that is stored in the message relay information storing unit 29. Specifically, in the relay system (A), the table distributing unit 39 and the table updating unit 40 synchronize the message relay information stored in each of the message relay devices 10 to 10b.

Furthermore, in the relay systems (B) to (D), when the message relay device 10a or 10b, which is not the message relay device 10, receives a first message to which a session ID retained by the message relay device 10 is added, the table updating unit 40 receives message relay information. Furthermore, in the relay systems (B) to (C), when the message relay device 10 receives a first message to which a session ID retained by the message relay device 10a or 10b, which is not the message relay device 10, is added, the table distributing unit 39 transfers message relay information.

The relay processing unit 11 and the relay destination information managing unit 12 measure the amount of resources consumed when a message is relayed or consumed when the transfer destination is queried and then stores the measured amount of resources in the resource consumption DB storing unit 14. Specifically, the relay processing unit 11 and the relay destination information managing unit 12 measure, for each URL that provides a service related to a message to be processed, the CPU time of a message relay process and the CPU time of a message transfer process.

Furthermore, the relay processing unit 11 and the relay destination information managing unit 12 measure the CPU time taken when the other message relay device is queried about information on the message relay destination and the CPU time taken when the message relay information is distributed. Then, the relay processing unit 11 and the relay destination information managing unit 12 store the measured CPU time in the resource consumption DB storing unit 14 for each URL that provides a service.

In the following, an example of calculating the amount of resources consumed by the relay processing unit 11 and the relay destination information managing unit 12 will be described. For example, the relay processing unit 11 and the relay destination information managing unit 12 measure the CPU time of processes indicated by m1 to m9 and o1 to o6 illustrated in FIGS. 5A and 5B. Then, by using the measured CPU time, the relay processing unit 11 and the relay destination information managing unit 12 calculate the amount of consumed resources from the differences between the CPU time taken before the process and the CPU time taken after the process.

Figures 12, 13:
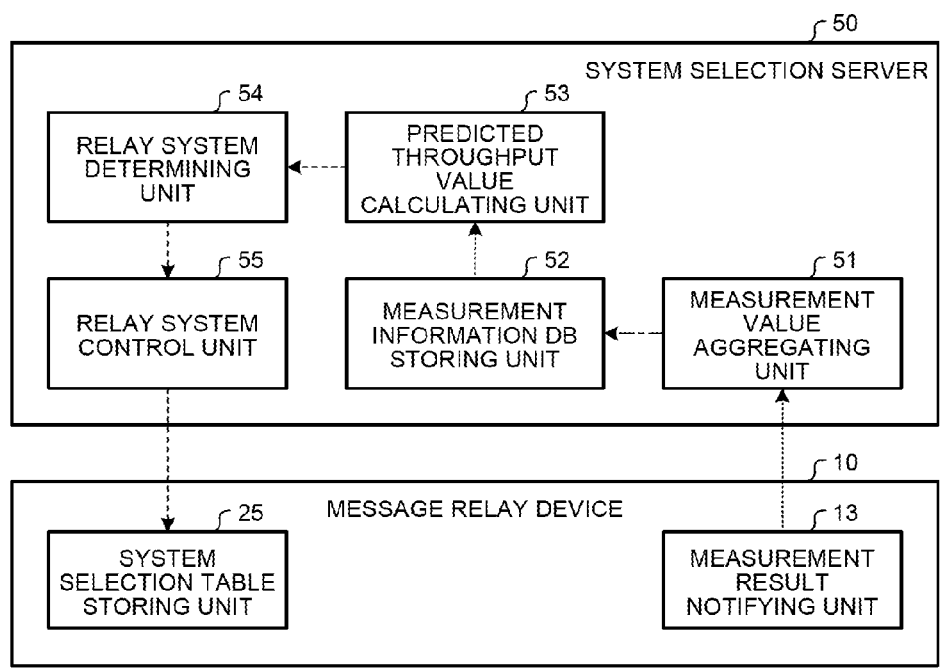
FIG. 12 is a schematic diagram illustrating a process for calculating the amount of resources needed for each process.
FIG. 13 is a schematic diagram illustrating the functional configuration of the system selection server according to the first embodiment.

FIG. 12 is a schematic diagram illustrating a process for calculating the amount of resources needed for each process. For example, the relay processing unit 11 and the relay destination information managing unit 12 calculate the amount of resources "$r_{fwd}$" consumed when the message relay process is performed by using "$r_{fwd}=(m3-m1)+\{(m4-m2)-(o6-o5)\}$". Furthermore, the relay processing unit 11 and the relay destination information managing unit 12 calculate the amount of resources "$r_{fwd2}$" consumed when the message transfer process is performed by using "$r_{fwd2}=(m7-m6)+(m3-m5)+(m4-m9)$".

Furthermore, the relay processing unit 11 and the relay destination information managing unit 12 calculate the amount of resources "$r_{query}$" consumed when the relay destination of a message is queried by using "$r_{query}=o2-o1$". Furthermore, the relay processing unit 11 and the relay destination information managing unit 12 calculate, as follows, the amount of resources "$r_{ctrl}$" consumed when the message relay information is distributed. Namely, when the relay processing unit 11 and the relay destination information managing unit 12 distribute the message relay information by using the relay system (A), "$r_{ctrl}=(o6-o5)/N$" is used. If one of the relay systems (B) to (D) is used for the distribution, "$r_{ctrl}=(o6-o5)$" is used. The message relay device 10 may also acquire the resource usage by using the function of measuring the resource usage of each process or each thread running on, for example, an operating system (OS).

A description will be given here by referring back to FIGS. 5A and 5B. The resource-usage notifying unit 41 notifies the system selection server 50 of the resource consumption value stored in the resource consumption DB storing unit 14 and also resets the resource consumption value stored in the resource consumption DB storing unit 14. Furthermore, the session update frequency notifying unit 42 transmits each piece of information stored in the session-update frequency-calculation counting unit 15 to the system selection server 50 and also resets the information stored in the session-update frequency-calculation counting unit 15.

In the following, a process performed by the system selection server 50 will be described with reference to FIG. 13. FIG. 13 is a schematic diagram illustrating the functional configuration of the system selection server according to the first embodiment. In the example illustrate din FIG. 13, the system selection server 50 includes a measurement value aggregating unit 51, a measurement information DB storing unit 52, a predicted throughput value calculating unit 53, a relay system determining unit 54, and a relay system control unit 55. The measurement information DB storing unit 52 is a storage device that stores therein, in an associated manner for each service (URL), the update frequency of a session and the amount of resources.

The measurement value aggregating unit 51 receives the resource consumption value transmitted by the resource-usage notifying unit 41 in the message relay device 10 and receives each piece of information transmitted by the session update frequency notifying unit 42 in the message relay device 10. Furthermore, the measurement value aggregating unit 51 also receives the resource consumption value and each piece of information from the other message relay devices 10a and 10b.

Then, the measurement value aggregating unit 51 aggregates, for each service (URL), the resource consumption values and each piece of the information received from each of the message relay devices 10 to 10b and performs the following process by using the aggregated resource consumption value and the aggregated pieces of information. First, the measurement value aggregating unit 51 calculates the session update frequency by dividing the session establishment count by the notified message processing count. Then, the measurement value aggregating unit 51 associates, for each service (URL), the calculated session update frequency with the resource consumption value that is notified by the resource-usage notifying unit 41 and then stores them in the measurement information DB storing unit 52.

By using the information stored in the measurement information DB storing unit 52, the predicted throughput value calculating unit 53 calculates, for each service (URL), the predicted value of the throughput obtained when a message is transferred using one of the relay systems (A) to (D). Then, the predicted throughput value calculating unit 53 notifies the relay system determining unit 54 of the calculated predicted value of the throughput.

In the following, a description will be given of a process for calculating the predicted value of the throughput performed by the predicted throughput value calculating unit 53. For example, the predicted throughput value calculating unit 53 calculates the sum of the amount of resources needed for relaying a single message, the amount of resources needed for determining the relay destination of the message, and the amount of resources needed for distributing the message relay information. Then, the predicted throughput value calculating unit 53 uses a value obtained by dividing the total amount of resources retained by the message relay devices 10 to 10b by the calculated sum of each of the resources as a predicted value of the throughput.

At this point, the amount of resources needed for determining the relay destination of a message varies in accordance with the size of a message or the contents of the relay process. For example, if the relay destination of a message stores therein the session ID that is contained in the message, when the amount of resources that is added to the amount of resources needed for relaying the message is represented by X, the value of X is the value illustrated in FIG. 14 depending on the relay systems (A) to (D).

FIG. 14 is a schematic diagram illustrating an example of the amount of resources. As illustrated in FIG. 14, in the relay system (A), because a message is not transferred to the other message relay devices 10a and 10b, the value of X is "0". In contrast, in the relay system (B), the value of X is obtained by multiplying the miss hit rate by the amount of resources needed when the message is transferred among message relay devices. The miss hit rate mentioned here is the probability that the message relay device corresponding to the transfer destination of a message does not store therein the address of a server that is associated with the session ID contained in the message to be transferred.

Furthermore, in the relay system (C) and the relay system (D), the value of X is obtained by multiplying the miss hit rate by the amount of resources needed for querying the address of an information processing server corresponding to the transfer destination of a message among the message relay devices. The miss hit rate mentioned here is the probability that the message relay device to be queried does not store therein the address of a server that is associated with the session ID contained in the message to be transferred.

Furthermore, the amount of resources needed for distributing the message relay information is a fixed value regardless of the service associated with a message. Consequently, when the amount of resources needed for distributing the message relay information is represented by Y, the value of Y is obtained by multiplying the session update frequency by the amount of resources needed for distributing the message relay information.

FIG. 15 is a schematic diagram illustrating an example of the amount of resources needed for distributing message relay information. As illustrated in FIG. 15, in the relay system (A), the value of Y is obtained by multiplying the amount of resources needed for distributing a single piece of message relay information by the number of message relay devices and the session update frequency. Furthermore, in the relay systems (B) to (D), the value of Y is obtained by multiplying the amount of resources needed for distributing a single piece of message relay destination information by the number of devices that distribute the message relay destination information and the session update frequency. At this point, the process for distributing the message relay destination information in the relay systems (B) to (D) is a process that notifies the other message relay devices of the address of a server that transfers a message.

In the following, a description will be given of a specific example of a process for calculating the predicted value of throughput performed by the predicted throughput value calculating unit 53. First, for a single service (URL), the predicted throughput value calculating unit 53 reads each of the amounts of resources and the session update frequency from the measurement information DB storing unit 52. Then, by using Equation (1) below, the predicted throughput value calculating unit 53 calculates the predicted value of the throughput obtained when a message is transferred using the relay system (A).

In Equation (1), $T_A$ is the predicted value of the throughput obtained when a message is transferred using the relay system (A). Furthermore, Rnode is the amount of resources in a node per unit time and is, for example, the clock frequency (GHz: gigahertz) of a CPU. In the specific example described below, the value of the Rnode is set to 3 (GHz). Furthermore, in Equation (1), the symbol N is the number of the message relay devices 10 to 10b. Furthermore, the symbol m is the number of messages transmitted and received in a single session and is the reciprocal of the session update frequency.

$$T_A = \frac{R_{node} \cdot N}{r_{fwd} + r_{ctrl} \cdot N \cdot \frac{1}{m}} \quad (1)$$

Furthermore, by using the Equation (2) below, the predicted throughput value calculating unit 53 calculates the predicted value of the throughput obtained when a message is transferred using the relay system (B). In Equation (2), $T_B$ is the predicted value of the throughput obtained when a message is transferred using the relay system (B).

$$T_B = \frac{R_{node} \cdot N}{\frac{n}{N} \cdot r_{fwd} + \left(1 - \frac{n}{N}\right) \cdot (r_{fwd} + r_{fwd2}) + r_{ctrl} \cdot n \cdot \frac{1}{m}} \quad (2)$$

$$= \frac{R_{node} \cdot N}{r_{fwd} + \left(1 - \frac{n}{N}\right) + r_{fwd2} + r_{ctrl} \cdot n \cdot \frac{1}{m}}$$

Furthermore, by using Equation (3) below, the predicted throughput value calculating unit 53 calculates the predicted value of the throughput obtained when a message is transferred using the relay system (C). In Equation (3), $T_C$ is the predicted value of the throughput obtained when a message is transferred using the relay system (C).

$$T_C = \frac{R_{node} \cdot N}{\frac{n}{N} \cdot r_{fwd} + \left(1 - \frac{n}{N}\right) \cdot (r_{fwd} + r_{query}) + r_{ctrl} \cdot n \cdot \frac{1}{m}} \quad (3)$$

$$= \frac{R_{node} \cdot N}{r_{fwd} + \left(1 - \frac{n}{N}\right) + r_{query} + r_{ctrl} \cdot n \cdot \frac{1}{m}}$$

Furthermore, by using Equation (4) below, the predicted throughput value calculating unit 53 calculates the predicted value of the throughput obtained when a message is transferred using the relay system (D). In Equation (4), $T_D$ is the predicted value of the throughput obtained when a message is transferred using the relay system (D). Furthermore, in Equation (4), the symbol p(k) is a variable that takes one of the values of n/N, (n+k)/N, and 1 in accordance with k, as indicated by Equation (5).

$$T_D = \frac{R_{node} \cdot N}{\sum_{k=1}^{m}\left[p(k) \cdot r_{fwd} + (1 - p(k)) \cdot (r_{fwd} + r_{query}) + r_{ctrl} \cdot \frac{1}{m} \cdot n\right] \cdot \frac{1}{m}} \quad (4)$$

$$p(k) = \begin{cases} \dfrac{n}{N} & (k = 1, 2) \\ \dfrac{n+k}{N} & (k \leq N - n) \\ 1 & (k > N - n) \end{cases} \quad (5)$$

Then, the predicted throughput value calculating unit 53 outputs the throughput of each of the relay systems (A) to (D) calculated using Equations (1) to (5) to the relay system determining unit 54.

When the relay system determining unit 54 receives the predicted value of the throughput of each of the relay systems (A) to (D) from the predicted throughput value calculating unit 53, the relay system determining unit 54 selects, for each service, a relay system in which the predicted value of the throughput is the largest. Then, the relay system determining unit 54 notifies the relay system control unit 55 of the selected relay system.

In the following, a process for selecting a relay system performed by the relay system determining unit 54 will be described with reference to FIGS. 16 and 17. FIG. 16 is a schematic diagram illustrating an example of predicted values of throughput. FIG. 17 is a schematic diagram illustrating an example of relay systems selected by the relay system determining unit. FIG. 16 illustrates, as an example, predicted values of the throughput obtained in each of the relay systems (A) to (D) calculated, by the predicted throughput value calculating unit 53, for each web application that is provided by each of the information processing servers 4 to 4b.

In the example illustrated in FIG. 16, the relay system determining unit 54 receives, for each service, the predicted values of the throughputs of each of the relay systems (A) to (D). Then, for the web application "host1/path11", the relay system determining unit 54 determines that the predicted value of the throughput of the relay system (D) is the largest.

Furthermore, for the service "host2/path21", the relay system determining unit 54 determines that the predicted value of the throughput of the relay system (B) is the largest. Furthermore, for the service "host2/path22", the relay system determining unit 54 determines that the predicted value of the throughput of the relay system (A) is the largest. Furthermore, for the service "host3", the relay system determining unit 54 determines that the predicted value of the throughput of the relay system (B) is the largest.

Consequently, as illustrated in FIG. 17, the relay system determining unit 54 creates a table indicating the relay system having the highest predicted value of the throughput for each web application and transmits the created table to the relay system control unit 55.

A description will be given here by referring back to FIG. 13. When the relay system control unit 55 receives a table indicating the relay system created by the relay system determining unit 54, the relay system control unit 55 reflects the contents of the received table into the system selection table storing unit 25. Specifically, the relay system control unit 55 updates the relay system that is associated with a service and is stored in the system selection table storing unit 25 to the contents of the table that is created by the relay system determining unit 54. Consequently, the message relay device 10 can transfer, for each service, a message by using a transfer system in which the predicted throughput is the largest.

As described above, the message relay device 10 relays, for each service in which a session indicated by a session ID contained in the message has been established, a message by using a relay system having the maximum throughput. Accordingly, the message relay device 10 can improve the entire processing performance of an information processing system.

Furthermore, when selecting a relay system, the system selection server 50 calculates the predicted value of the throughput by using the session update frequency, the amount of resources needed for the transfer process of a message, and the amount of resources needed for querying the relay destination of the message. Furthermore, the system selection server 50 calculates the predicted value of the throughput for each relay system by using the amount of resources needed for distributing the message relay information.

Accordingly, even if the amount of resources needed for processing a message varies for each service that is provided by each of the information processing servers 4 to 4b, the system selection server 50 can select the relay system having the maximum throughput.

Figure 18:
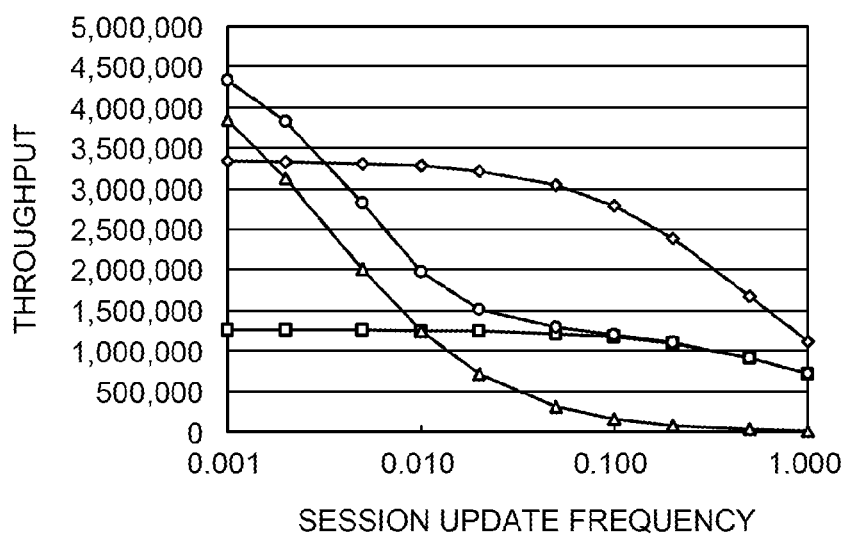
FIG. 18 is a schematic diagram illustrating throughput performance obtained when the processing load of a message is small.
Figure 19:
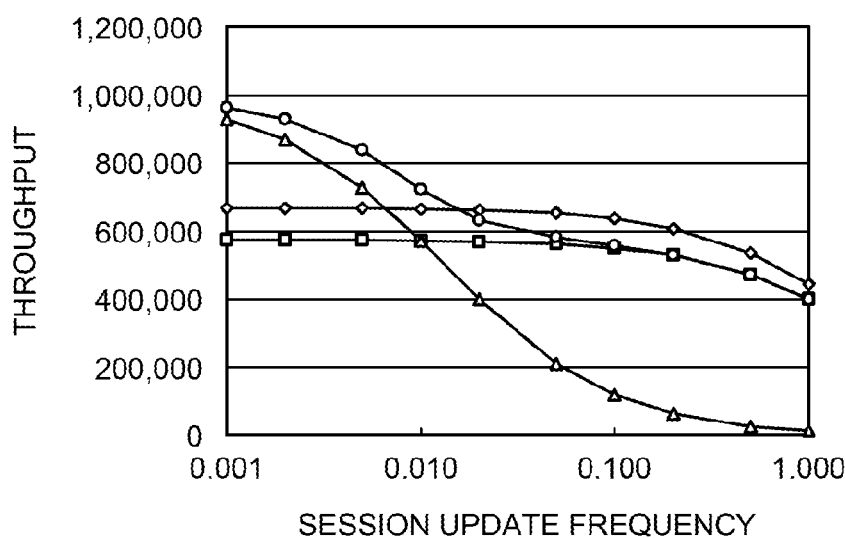
FIG. 19 is a schematic diagram illustrating throughput performance obtained when the processing load of a message is large.

In the following, the differences in the throughput performance according to the processing load of a message will be described with reference to FIGS. 18 and 19. FIG. 18 is a schematic diagram illustrating throughput performance obtained when the processing load of a message is small. FIG. 19 is a schematic diagram illustrating throughput performance obtained when the processing load of a message is large.

In the example illustrated in FIGS. 18 and 19, calculated values of the throughput of each of the relay systems (A) to (D) are indicated by plotting the session update frequency on the horizontal axis and by plotting the throughput on the vertical axis. Furthermore, in the example illustrated in FIGS. 18 and 19, the throughput of the relay system (A) is plotted as triangles, the throughput of the relay system (B) is plotted as diamonds, the throughput of the relay system (C) is plotted as squares, and the throughput of the relay system (D) is plotted as circles.

In the example illustrated in FIG. 18, if the load of a message is small, the throughput of the relay system (B) is double the throughputs of the other relay systems roughly at a point where the update frequency of a session exceeds 0.05. Furthermore, as illustrated in FIG. 18, if the load of a message is small, the relay system (D) has the largest throughput at the point where the session update frequency is 0.001; however, the throughput of the relay system (B) becomes largest of the relay systems roughly at the point where the session update frequency exceeds 0.005.

In contrast, as illustrated in FIG. 19, if the load of a message is large, the throughputs of the relay systems (A) and (D) are largest of the relay systems at the point where the session update frequency is 0.001; however, the throughput of the relay system (B) becomes largest of the relay systems roughly at the point where the session update frequency exceeds 0.010. As described above, the throughput of each of the relay systems (A) to (D) varies in accordance with the session update frequency and the processing load of a message. Consequently, the system selection server 50 can improve the processing load of the information processing system 1 by calculating the throughput from the measured session update frequency, the processing load of a message, and the like and by selecting a relay system having the maximum throughput.

The relay processing unit 11, the relay destination information managing unit 12, and the measurement result notifying unit 13 are, for example, electronic circuits. Furthermore, the response receiving unit 16, the response receiving unit 17, the relay system selecting unit 18, the new-session identifying unit 19, the new-session counter updating unit 20, and the message process counter updating unit 21 are electronic circuits.

Furthermore, the response transmitting unit 22, the destination device transferring unit 23, the request receiving unit 24, the relay system selecting unit 26, the request receiving unit 27, the relay destination determining unit 28, and the request transferring unit 30 are electronic circuits. Furthermore, the transfer destination querying unit 31, the destination device transferring unit 32, and the relay destination querying unit 33 are electronic circuits.

Furthermore, the relay destination information replying unit 36, the relay destination information acquiring unit 37, the relay destination information retaining device searching unit 38, the table distributing unit 39, and the table updating unit 40 are electronic circuits. Furthermore, the resource-usage notifying unit 41, the session update frequency notifying unit 42, the measurement value aggregating unit 51, the predicted throughput value calculating unit 53, the relay system determining unit 54, and the relay system control unit 55 are electronic circuits. Examples of the electronic circuits include an integrated circuit, such as an application specific integrated circuit (ASIC) or a field programmable gate array (FPGA), a central processing unit (CPU), or a micro processing unit (MPU).

Furthermore, the resource consumption DB storing unit 14, the session-update frequency-calculation counting unit 15, the system selection table storing unit 25, the message relay information storing unit 29, the cache 34, the message relay device list storing unit 35, and the measurement information DB storing unit 52 are storage devices. Examples of the storage devices include a semiconductor memory device, such as a random access memory (RAM), a flash memory, and the like or a storage device, such as a hard disk, an optical disk, and the like.

Figure 20:
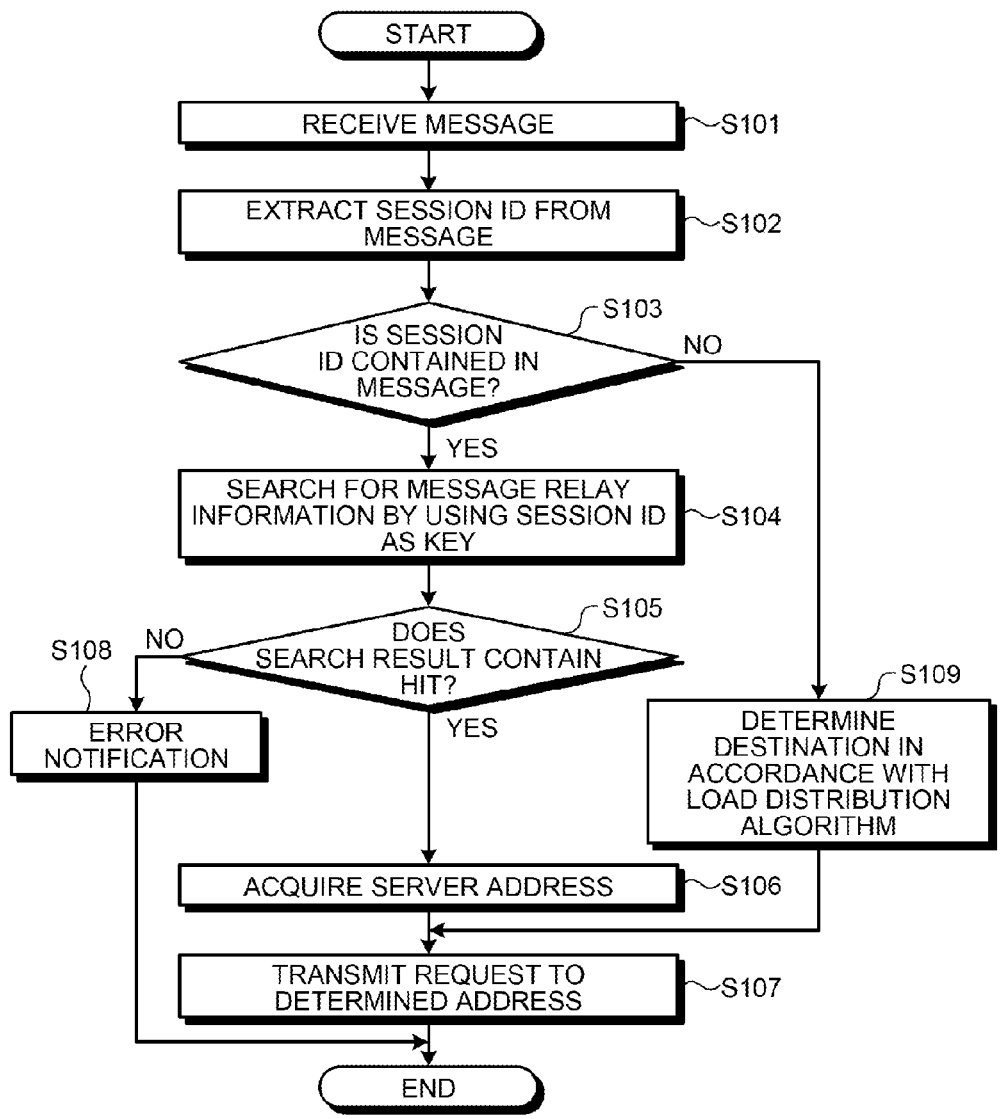
FIG. 20 is a flowchart illustrating the flow of a relay process performed on a request.

In the following, the flow of processes performed by the message relay device 10 will be described with reference to the drawings. First, the flow of a process performed when the message relay device 10 receives a request will be described with reference to FIG. 20. FIG. 20 is a flowchart illustrating the flow of a relay process performed on a request. FIG. 20 illustrates the flow of a process performed when the message relay device 10 receives a message from the load balancer 3. Furthermore, FIG. 20 illustrates the flow of a process performed when the message relay device 10 relays a message by itself.

For example, the message relay device 10 receives a message from the load balancer 3 (Step S101). Then, the message relay device 10 extracts a session ID from the message (Step S102). Then, the message relay device 10 determines whether the session ID is contained in the message (Step S103). If the session ID is contained in the message (Yes at Step S103), the message relay device 10 searches for the message relay information by using the session ID as a key (Step S104).

Then, the message relay device 10 determines whether the search result, i.e., a server address, contains a hit (Step S105). If the search result contains a hit (Yes at Step S105), the message relay device 10 acquires the hit server address (Step S106). Then, the message relay device 10 transmits a request to the acquired server address as the destination (Step S107) and ends the process.

In contrast, if the search result does not contain a hit (No at Step S105), the message relay device 10 notifies the clients 2 to 2b via the load balancer 3 of an error (Step S108) and ends the process. Furthermore, if the session ID is not contained in the message (No at Step S103), the message relay device 10 determines a destination in accordance with the load distribution algorithm that is previously set (Step S109) and transmits a request (Step S107). The previously set load distribution algorithm mentioned here is an algorithm for selecting, for example, in a round robin manner or randomly, an information processing server that corresponds to the destination of a request.

Figure 21:
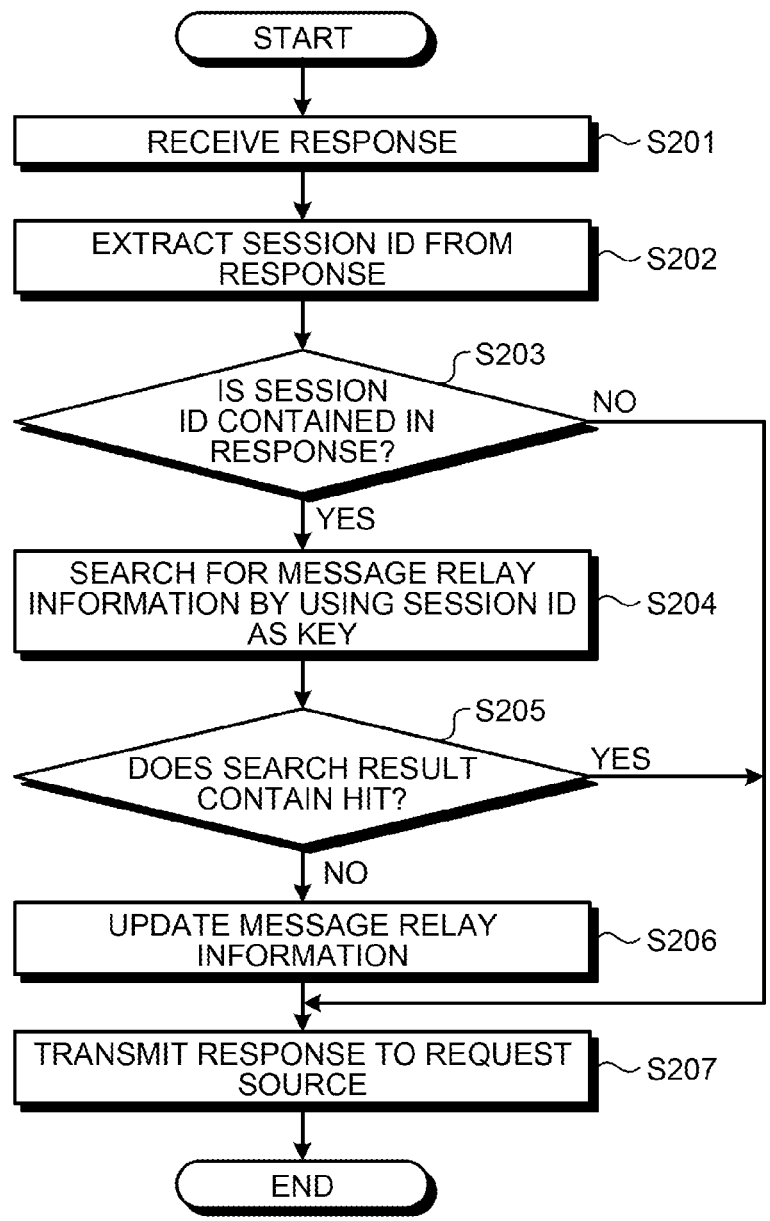
FIG. 21 is a flowchart illustrating the flow of a relay process performed on a response.

In the following, the flow of a process performed when the message relay device 10 receives a response from the information processing servers 4 to 4b will be described with reference to FIG. 21. FIG. 21 is a flowchart illustrating the flow of a relay process performed on a response. FIG. 21 illustrates, as an example, the flow of a process performed when the message relay device 10 receives a response to a message using the relay system (A). Furthermore, FIG. 21 illustrates the flow of a process performed when the message relay device 10 relays a message by itself.

For example, when the message relay device 10 receives a response (Step S201), the message relay device 10 extracts a session ID from the response (Step S202). Then, the message relay device 10 determines whether the session ID is contained in the response (Step S203). If the session ID is contained in the response (Yes at Step S203), the message relay device 10 searches for message relay information by using the session ID as a key (Step S204).

Then, the message relay device 10 determines whether the search result contains a hit (Step S205). If the search result does not contain a hit (No at Step S205), the message relay device 10 updates the message relay information (Step S206). Specifically, the message relay device 10 associates the session ID with the server address of the information processing server that corresponds to the transmission source of the response and adds them to the message relay information.

Thereafter, the message relay device 10 transmits the response to the request source (Step S207) and ends the process. In contrast, if the search result contains a hit (Yes at Step S205), the message relay device 10 transmits the response to the request source without processing anything (Step S207) and ends the process. Furthermore, if the session ID is not contained in the response (No at Step S203), the message relay device 10 transmits the response to the request source (Step S207) and ends the process.

Figure 22:
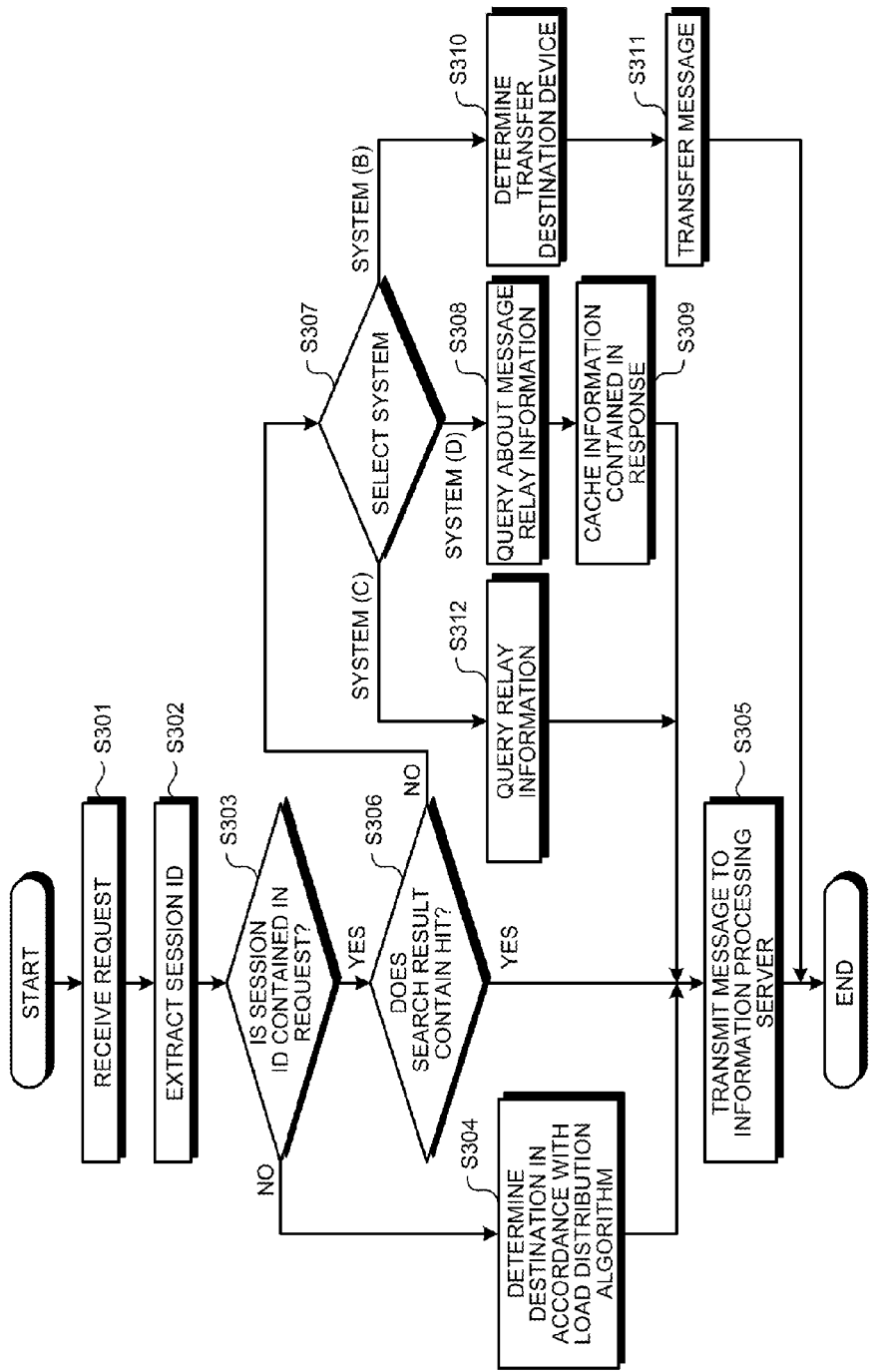
FIG. 22 is a flowchart illustrating the flow of a process performed when the message relay device receives a request.

In the following, the flow of a process performed when the message relay device 10 receives a request distributed by the load balancer 3 will be described with reference to FIG. 22. FIG. 22 is a flowchart illustrating the flow of a process performed when the message relay device receives a request. FIG. 22 illustrates the flow of a process for relaying a message performed by the message relay device 10 in liaison with the other message relay devices 10a and 10b.

The processes performed at Steps S301 to S303, Step S304, and Step S306 illustrated in FIG. 22 are the same as those performed at Steps S101 to S103, Step S109, and Step S105 illustrated in FIG. 20; therefore, descriptions thereof will be omitted. For example, if the search result does not contain a hit (No at Step S306), the message relay device 10 selects a system associated with the session ID from the system selection table (Step S307).

Specifically, if the relay system associated with the session ID is the relay system (D) (Step S307: system (D)), the message relay device 10 queries the other message relay devices about the message relay information (Step S308). Then, the message relay device 10 caches the information contained in the response (Step S309), transmits a message to an information processing server (Step S305) and ends the process.

Furthermore, if the relay system associated with the session ID is the relay system (B) (Step S307: system (B)), the message relay device 10 determines, by using a hash function, a message relay device to which the message is transferred (Step S310). Then, the message relay device 10 transfers the message to the determined message relay device (Step S311) and ends the process.

Furthermore, if the relay system associated with the session ID is the relay system (C) (Step S307: system (C)), the message relay device 10 queries the other message relay devices 10a and 10b about the message relay information (Step S312). Then, the message relay device 10 transmits a message to an information processing server having the server address acquired from the message relay device 10a or 10b (Step S305) and ends the process. Furthermore, if the relay system associated with the session ID is the relay system (A), the search result always contains a hit at Step S306 (Yes at Step S306).

Figure 23:
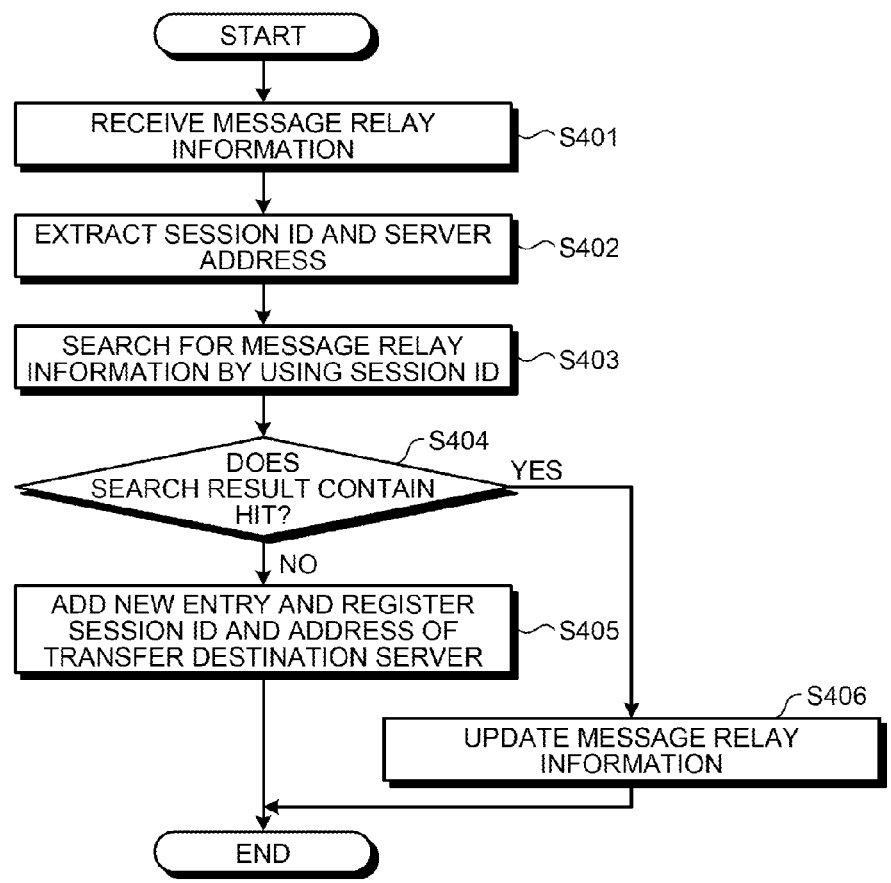
FIG. 23 is a flowchart illustrating the flow of a process performed when the message relay device receives message relay information.

In the following, the flow of a process performed when the message relay device 10 receives, from the other message relay device 10a or 10b, message relay information about a message that is relayed in each of the relay systems (A) to (D) will be described with reference to FIG. 23. FIG. 23 is a flowchart illustrating the flow of a process performed when the message relay device receives message relay information.

For example, the message relay device 10 receives message relay information from the other message relay device 10a or 10b (Step S401). Then, the message relay device 10 extracts, from the received message relay information, a session ID and a server address that corresponds to the transfer destination (Step S402). Then, the message relay device 10 searches for message relay information by using the extracted session ID (Step S403) and determines whether the search result contains a hit (Step S404).

If the search result does not contain a hit (No at Step S404), the message relay device 10 adds, to the message relay information, an entry in which the extracted session ID is associated with the server address that corresponds to the transfer destination (Step S405) and ends the process. If the search result contains a hit (Yes at Step S404), the message relay device 10 updates the message relay information (Step S406) and ends the process.

Figure 24:
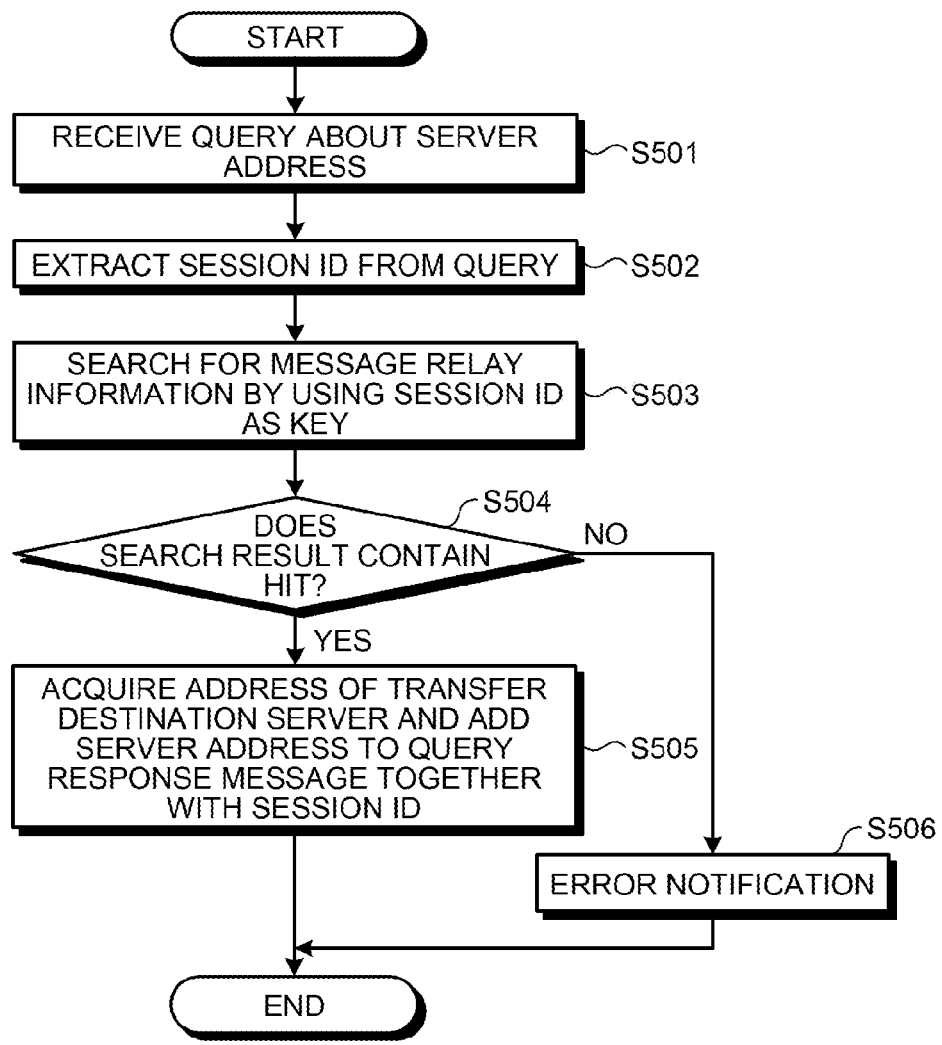
FIG. 24 is a flowchart illustrating the flow of a process performed when the message relay device receives a query about a server address.

In the following, the flow of a process performed when the message relay device 10 receives a query about the server address used in the relay systems (C) and (D) from the other message relay devices 10a and 10b will be described with reference to FIG. 24. FIG. 24 is a flowchart illustrating the flow of a process performed when the message relay device receives a query about a server address.

For example, the message relay device 10 receives a query about a server address from the other message relay device 10a or 10b (Step S501). Then, the message relay device 10 extracts a session ID from the query (Step S502). Then, the message relay device 10 searches for message relay information by using the extracted session ID as a key (Step S503) and determines whether the search result contains a hit (Step S504).

If the search result contains a hit (Yes at Step S504), the message relay device 10 performs the following process. Namely, the message relay device 10 acquires the hit server address corresponding to the transfer destination, adds the server address to the query response message together with the session ID, transmits the server address to the message relay device that corresponds to the query source (Step S505), and ends the process. In contrast, if the search result does not contain a hit (No at Step S504), the message relay device 10 transmits an error notification to the message relay device that corresponds to the query source (Step S506) and ends the process.

Figure 25:
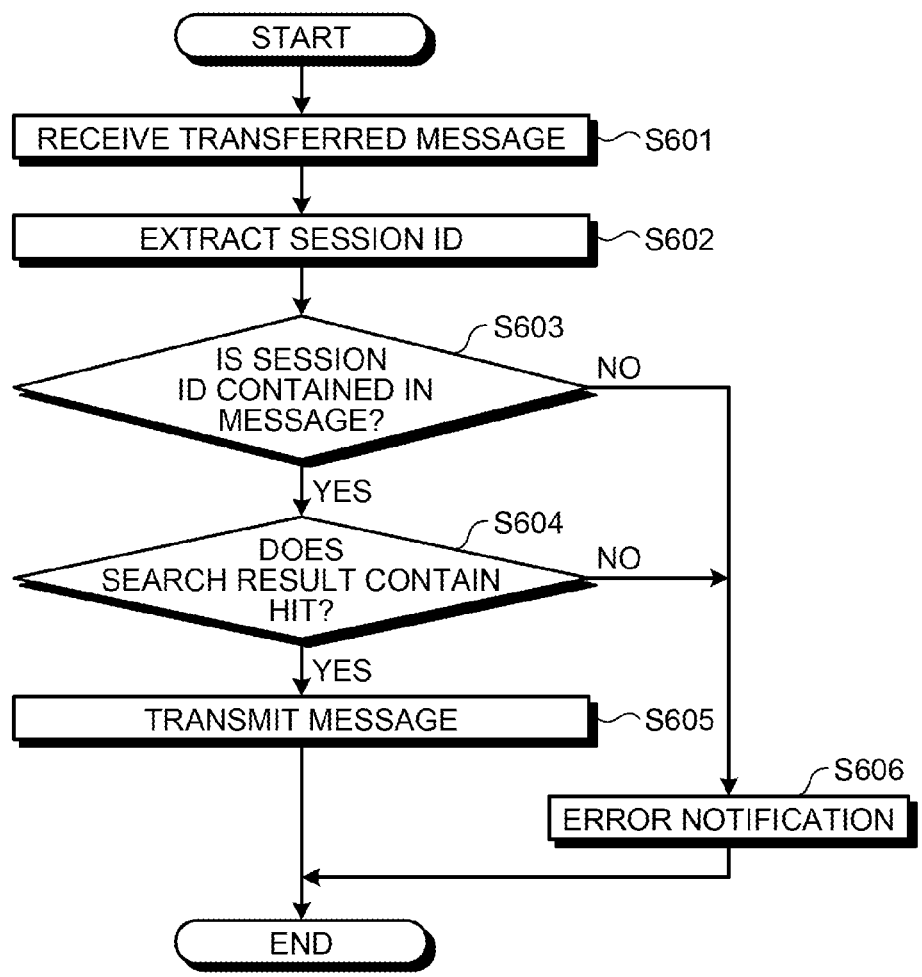
FIG. 25 is a flowchart illustrating the flow of a process performed when the message relay device receives a transfer message.

In the following, the flow of a process performed when the message relay device 10 receives a message that is transferred using the relay system (B) from the other message relay devices 10a and 10b will be described with reference to FIG. 25. FIG. 25 is a flowchart illustrating the flow of a process performed when the message relay device receives a transfer message.

In the example illustrated in FIG. 25, the message relay device 10 receives a message that is transferred from the other message relay device 10a or 10b (Step S601). Then, the message relay device 10 extracts a session ID from the received message (Step S602). Thereafter, the message relay device 10 determines whether the session ID is contained in the message (Step S603). If the session ID is contained in the message (Yes at Step S603), the message relay device 10 performs the following process.

Namely, the message relay device 10 searches for message relay information by using the extracted session ID as a key and determines whether the search result contains a hit (Step S604). Then, if the search result contains a hit (Yes at Step S604), the message relay device 10 transmits the message to the hit server address as the destination (Step S605) and ends the process.

In contrast, if the session ID is not contained in the transferred message (No at Step S603), the message relay device 10 notifies the message relay device corresponding to the transfer source of the message of an error (Step S606) and ends the process. Furthermore, if the search result does not contain a hit (No at Step S604), the message relay device 10 notifies the message relay device corresponding to the transfer source of the message of an error (Step S606) and ends the process.

Figure 26:
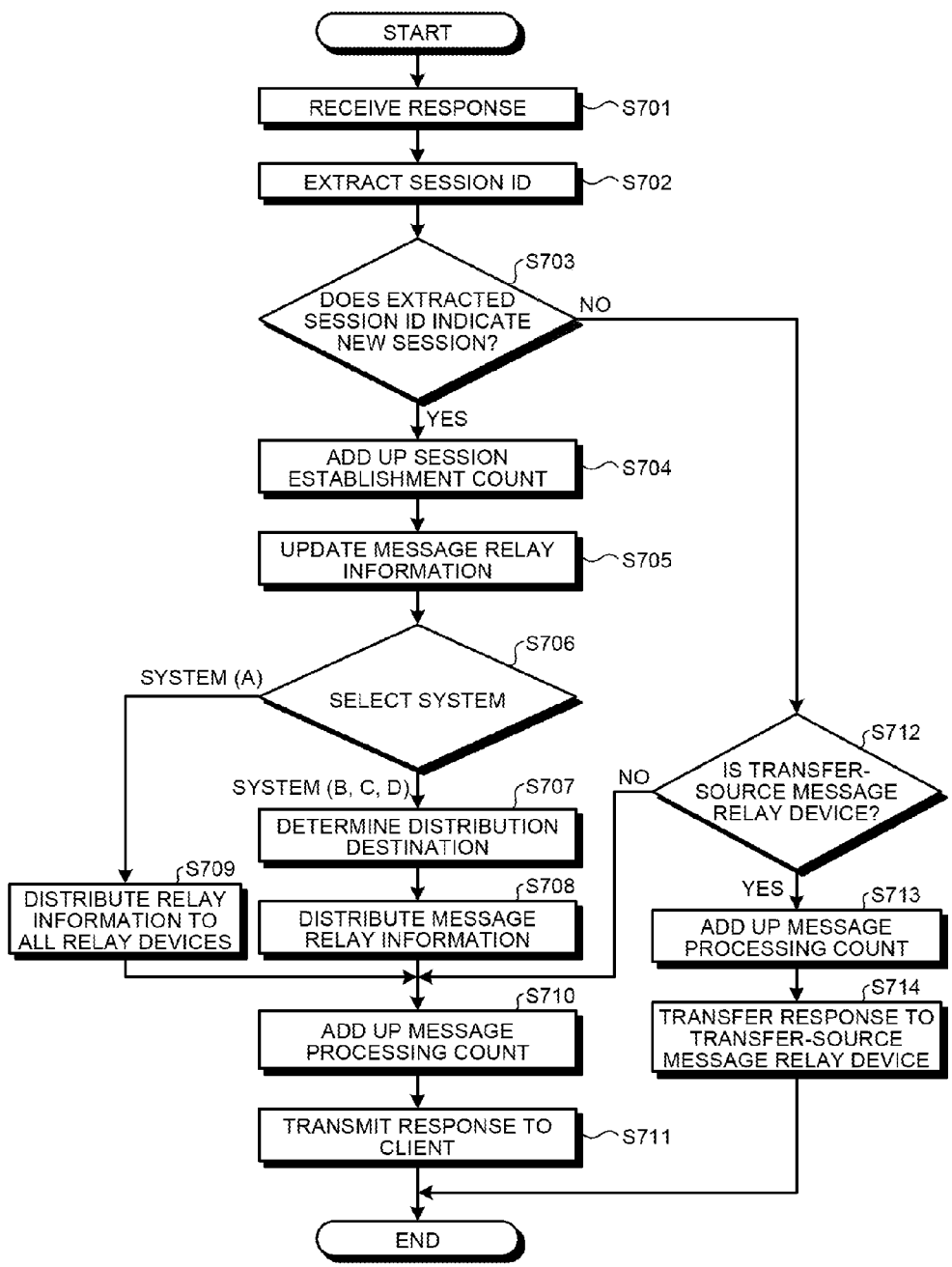
FIG. 26 is a flowchart illustrating the flow of a process performed when the message relay device receives a response.

In the following, the flow of a process performed when the message relay device 10 receives a response from the information processing servers 4 to 4b will be described with reference to FIG. 26. FIG. 26 is a flowchart illustrating the flow of a process performed when the message relay device receives a response.

For example, when the message relay device 10 receives a response (Step S701), the message relay device 10 extracts a session ID from the response (Step S702) and determines whether a session indicated by the extracted session ID is a new session (Step S703). If the session indicated by the extracted session ID is a new session (Yes at Step S703), the message relay device 10 adds up the session establishment count (Step S704).

Then, the message relay device 10 updates the message relay information (Step S705) and searches the system selection table for a relay system used for a message that contains the extracted session ID (Step S706). Then, if the relay system is one of the relay systems (B) to (D) (Step S706: system (B, C, or D)), the message relay device 10 determines to distribute the message relay information (Step S707) and distributes the message relay information (Step S708).

In contrast, if the relay system is the relay system (A) (Step S706: system (A)), the message relay device 10 distributes the message relay information to all of the message relay devices (Step S709). Then, the message relay device 10 adds up the message processing count (Step S710), transmits a response to the clients 2 to 2b via the load balancer 3 (Step S711), and ends the process.

In contrast, if the session indicated by the extracted session ID is not a new session (No at Step S703), the message relay device 10 determines whether the transfer source of a message related to the response is the other message relay device (Step S712). If the transfer source of a message related to the response is the other message relay device (Yes at Step S712), the message relay device 10 adds up the message processing count (Step S713).

Thereafter, the message relay device 10 transfers the response to the message relay device corresponding to the transfer source of the message (Step S714) and ends the process. In contrast, if the transfer source of the message related to the response is not the other message relay device (No at Step S712), the message relay device 10 performs the process at Step S710.

Advantage of the First Embodiment

As described above, the message relay device 10 stores therein message relay information in which a session ID of a session that has been established by a program running on one of the information processing servers 4 to 4b is associated with the server address of one of the information processing servers 4 to 4b in which the session has been established. Then, the message relay device 10 determines whether there is, contained in the message relay information, the session ID contained in the message. If the message relay device 10 determines that the session ID is not contained in the message relay information, the message relay device 10 transmits the message by using a relay system stored in the system selection table. Specifically, the message relay device 10 transfers the message by using the relay system selected by the system selection server 50 in accordance with the service provided by the program that has established the session.

Accordingly, the message relay device 10 can improve the throughput exhibited when a message is relayed. Specifically, the system selection server 50 selects, for each service provided by a program that has established a session, a relay system having the maximum throughput. Consequently, the message relay device 10 can relay a message by using a relay system having the maximum throughput.

Furthermore, the system selection server 50 selects a relay system in accordance with the session update frequency of a service. Accordingly, the message relay device 10 can improve the throughput exhibited when a message is relayed. For example, if the session update frequency of a service is low, the message relay device 10 relays a message by using the relay system (A). If the session update frequency of a service is high, the message relay device 10 relays a message by using one of the other relay systems (B) to (D). Consequently, the message relay device 10 can reduce the processing load applied when a message is relayed, thus improving the throughput.

Furthermore, when relaying a message, the message relay device 10 relays the message by using one of the relay systems (A) to (D). Consequently, the message relay device 10 can relay the message by using the relay system having the maximum throughput in accordance with the session update frequency or the processing load applied when the message is relayed.

Furthermore, the system selection server 50 calculates the throughput of each of the relay systems (A) to (D) by using the session update frequency, the amount of resources consumed when message relay information is distributed, and the amount of resources consumed when a message is transferred to the other message relay device. Furthermore, the system selection server 50 calculates the throughput obtained when each of the relay systems (A) to (D) operates using the amount of resources consumed when sending a query about a server that transmits a message. Then, the system selection server 50 selects the relay system having the maximum throughput from among the calculated throughputs. Consequently, the message relay device 10 can transfer a message by using the relay system that has the maximum throughput when the message is transferred.

Furthermore, the message relay device 10 measures the update frequency of a session, the amount of resources consumed when message relay information is synchronized, and the amount of resources consumed when a message is transferred to the other message relay device. Then, by using the update frequency of the session and by using each of the amounts of resources measured by the message relay device 10, the system selection server 50 calculates the value of the throughput of each of the relay systems (A) to (D). Consequently, because the message relay device 10 transfers a message by using a relay system in accordance with the throughput predicted by using the actually measured value, the message relay device 10 can relay the message by using a more suitable relay system.

Furthermore, when the message relay device 10 receives a response from one of the information processing servers 4 to 4b, the message relay device 10 determines whether the session indicated by the session ID that is contained in the received response is a new session. If the session indicated by the session ID that is contained in the received response is a new session, the message relay device 10 selects a relay method of the message in accordance with the service provided by the program that has established the session. Specifically, the message relay device 10 selects a relay method that relays the subsequent message, which receives the same service as that provided by the program that has established a new session. Consequently, the message relay device 10 can improve the throughput when relaying a message that receives the service provided by the program that has established the new session.

Furthermore, if the session indicated by the session ID of the response is not a new session, the message relay device 10 transfers the response to the clients 2 to 2b or to the message relay device 10a or 10b that corresponds to the transfer destination of the message. Consequently, even if the message relay device 10 uses the relay system (B) in which a message is transferred to the other message relay device 10a or 10b, the message relay device 10 can appropriately transfer the response.

Furthermore, the message relay device 10 stores therein a system selection table in which a service is associated with a relay system. Then, the message relay device 10 relays a message by using a relay system stored in the system selection table. Consequently, the message relay device 10 can promptly perform a process for selecting a relay system when the message relay device 10 transfers a message, thus reducing the latency when the message is transferred.

[b] Second Embodiment

In the above explanation, the embodiment of the present invention has been described; however, the present invention can be implemented with various kinds of embodiments other than the embodiment described above. Accordingly, in the following, another embodiment included in the present invention will be described as a second embodiment.

(1) Measurement Timing of the Amount of Resources

The message relay device 10 described above measures the session update frequency and the amount of resources consumed when a message is transferred at a predetermined timing and transmits the measurement results to the system selection server 50 at predetermined time intervals. However, the process for measuring the amount of resources related to a message by the message relay device 10 may also be performed at an arbitrary timing.

Figure 27:
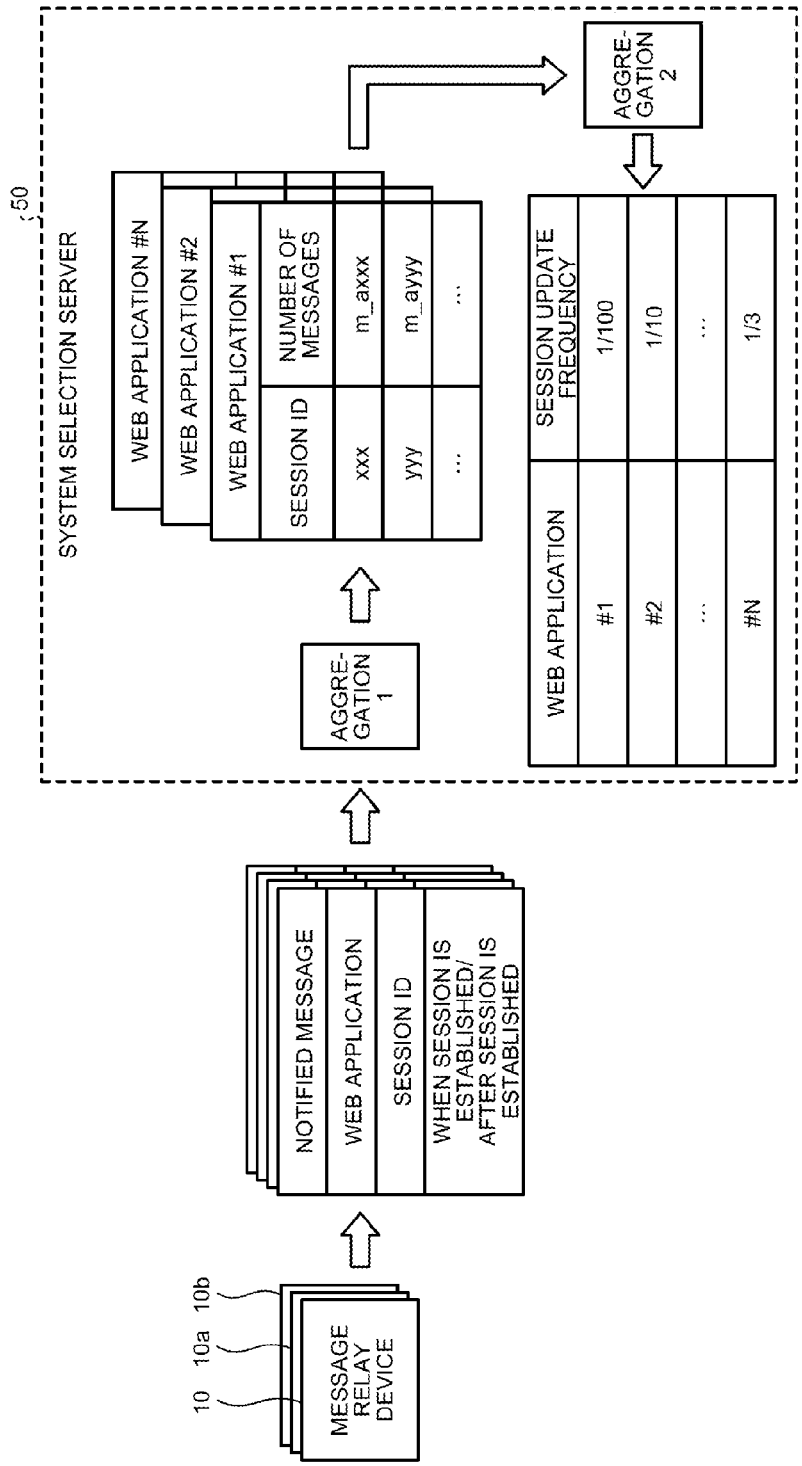
FIG. 27 is a schematic diagram illustrating the computational resource used when collecting the update frequency of a session.
Figure 28:
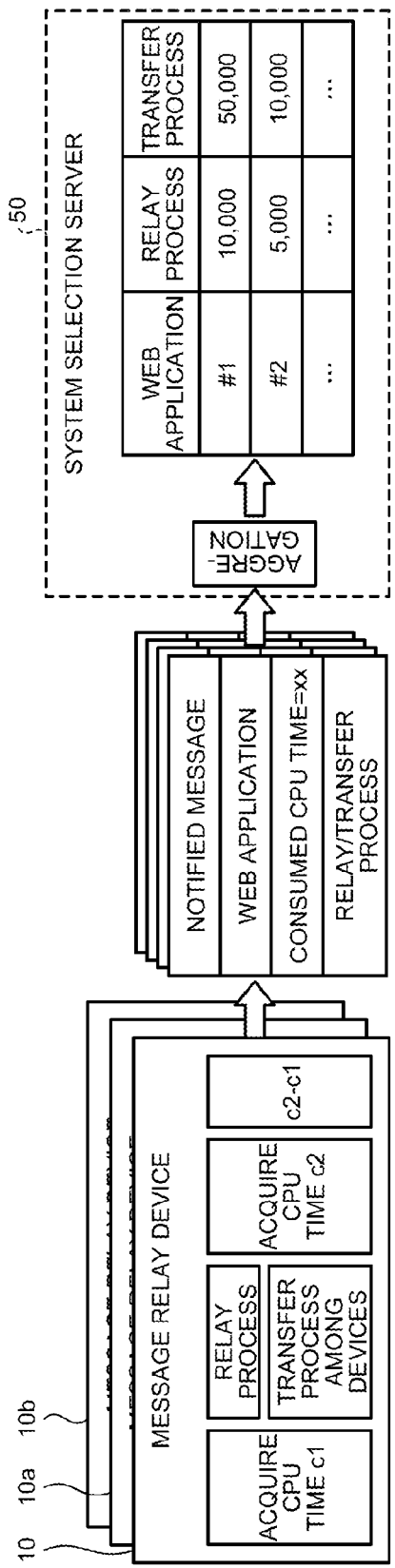
FIG. 28 is a schematic diagram illustrating the computational resource consumed in a message relay process.

For example, the flow of a process performed when each of the message relay devices 10 to 10b notifies the system selection server 50 of a message will be described with reference to FIGS. 27 and 28. FIG. 27 is a schematic diagram illustrating the computational resource used when collecting the update frequency of a session. FIG. 28 is a schematic diagram illustrating the computational resource consumed in a message relay process.

For example, every time each of the message relay devices 10 to 10b receives a message, each of the message relay devices 10 to 10b transmits, to the system selection server 50, a web application and a session ID related to the message when a session is established and after the session is established. Then, every time the system selection server 50 receives the message, the system selection server 50 aggregates messages from the message relay devices 10 to 10b and calculates the session update frequency for each web application from the aggregation result.

Furthermore, in the example illustrated in FIG. 28, every time each of the message relay devices 10 to 10b relays a message, each of the message relay devices 10 to 10b acquires the CPU times c1 and c2 before and after the process is performed, respectively, and calculates the amount of resources (CPU time) by subtracting c1 from c2. Then, each of the message relay devices 10 to 10b transfers the calculated CPU time to the system selection server 50. Then, the system selection server 50 aggregates the amounts of resources every time a message is relayed and calculates the throughput.

At this point, if each of the message relay devices 10 to 10b sends a notification indicating the session update frequency or the amount of resources every time each of the message relay devices 10 to 10b performs a relay process on a message, the processing load of both the message relay devices 10 to 10b and the system selection server 50 increases. Accordingly, each of the message relay devices 10 to 10b may also calculate, at predetermined time intervals, the average amount of resources and notifies the system selection server 50 of the calculated average.

Figure 29:
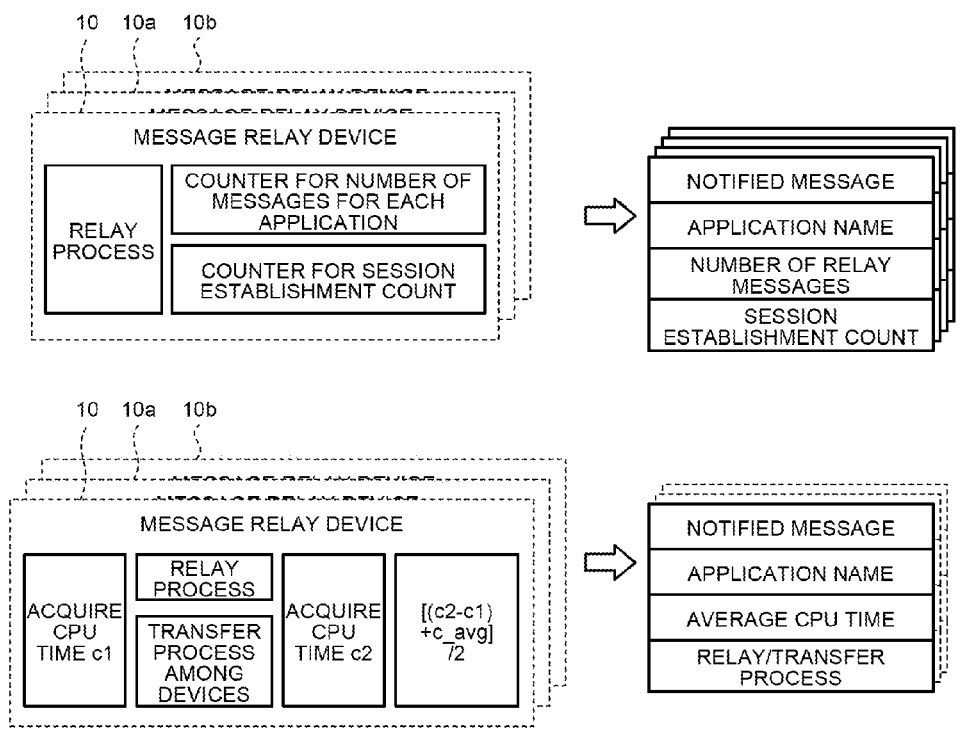
FIG. 29 is a schematic diagram illustrating the computational resource consumed when the system selection server is notified of an average value.

FIG. 29 is a schematic diagram illustrating the computational resource consumed when the system selection server is notified of an average value. As illustrated in FIG. 29, each of the message relay devices 10 to 10b adds up a counter for the number of messages for each application and a counter for the session establishment count every time each of the message relay devices 10 to 10b performs a relay process on a message. Then, each of the message relay devices 10 to 10b notifies the system selection server 50 of the counted values at predetermined time intervals. Furthermore, each of the message relay devices 10 to 10b calculates the average value of the amount of resources and transmits the calculated average value to the system selection server 50.

Consequently, each of the message relay devices 10 to 10b can reduce the amount of resources consumed when a relay system is selected. Specifically, each of the message relay devices 10 to 10b calculates the average values of the session update frequency and the amount of resources and transmits the calculated average values to the system selection server 50. Consequently, each of the message relay devices 10 to 10b can reduce the amount of resources consumed when a relay system is selected.

(2) Message Relay Device that Transmits the Session Update Frequency and the Amount of Resources The message relay devices 10 to 10b according to the first embodiment notify a message relay device of the message processing count, the session establishment count, and the amount of resources; however, the embodiment is not limited thereto. For example, a single message relay device may also be used as a sampling node and only the sampling node may also send notifications of the message processing count, the session establishment count, and the amount of resources.

FIG. 30 is a schematic diagram illustrating a process performed when a single message relay device is used as a sampling node. In the example illustrated in FIG. 30, from among the message relay devices 10 to 10b, only the message relay device 10 that is selected as a sampling node transmits a message to the system selection server 50.

At this point, the load balancer 3 randomly distributes messages to the message relay devices 10 to 10b by using information, such as a TCP header, without referring to session IDs. Consequently, messages each of which are for establishing a session are distributed equally to each of the message relay devices 10 to 10b. Consequently, by using an arbitrary message relay device as a sampling node, the information processing system 1 can select a suitable relay system.

Furthermore, the information processing system 1 can reduce the amount of resources consumed by each of the message relay devices 10 to 10b and the amount of resources consumed when the system selection server 50 selects a relay system. Consequently, the information processing system 1 can improve the throughput of each of the message relay devices 10 to 10b.

(3) Average Value of the Amount of Resources

The message relay device 10 according to the first embodiment overwrites the resource consumption value stored in the resource consumption DB storing unit 14 every time the message relay device 10 performs a process on a message; however, the embodiment is not limited thereto. For example, the message relay device 10 may also register, in the resource consumption DB, a value obtained by dividing the sum of the resource consumption values stored in the resource consumption DB storing unit 14 and the new resource consumption value by two. In such a case, even if, for example, a resource consumption value that deviates widely from the average is measured, the message relay device 10 can prevent a message from being transmitted using an erroneous relay system.

(4) Changing Relay Devices

In the first embodiment, in the relay system (A), all of the message relay devices 10 to 10b store therein message relay information on a certain session ID. Furthermore, in the relay systems (B) and (C), a single message relay device stores therein message relay information on a certain session ID.

Furthermore, in the relay system (D), a single message relay device stores therein message relay information on a certain session ID and multiple message relay devices cache the message relay information. Consequently, if a relay system is changed to another relay system for a certain service, the message relay information stored in each of the message relay devices 10 to 10b needs to be updated.

Accordingly, in the information processing system 1, the function of managing a session may also be performed by the system selection server 50. For example, when a new session is established, each of the message relay devices 10 to 10b notifies the system selection server 50 of, as a pair, the new session's service and session ID. Furthermore, when deleting a session due to the time-out or the like, each of the message relay devices 10 to 10b notifies the system selection server 50 of the deletion of the session. Then, the system selection server 50 manages the established session in accordance with the notifications indicating the service and the session ID as a pair and the deletion of the session received from each of the message relay devices 10 to 10b.

FIG. 31 is a schematic diagram illustrating an example of already-established session information. In the example illustrated in FIG. 31, the system selection server 50 stores therein a list in which a service is associated with a session ID that indicates the established session for a service. If a relay system for a service is changed from one of the relay systems (B) to (D) to the relay system (A), the system selection server 50 performs the following process.

Namely, first, the system selection server 50 refers to the list illustrated in FIG. 31 and acquires the session ID of a session established for a service for which the relay system has been changed. Then, the system selection server 50 performs a hash calculation and a remainder calculation for each session ID and specifies a message relay device that stores therein message relay information.

Then, the system selection server 50 distributes the message relay information to the message relay devices other than the specified message relay device. The system selection server 50 may also acquire the message relay information from the specified message relay device and distribute the message relay information to the message relay devices other than the specified message relay device.

In contrast, if a relay system for a service is changed from the relay system (A) to one of the relay systems (B) to (D), the system selection server 50 performs the following process. Namely, first, the system selection server 50 refers to the list illustrated in FIG. 31 and acquires the session ID of a session established for a service for which the relay system has been changed. Then, the system selection server 50 performs a hash calculation and a remainder calculation for each session ID and specifies a message relay device that stores therein message relay information. Thereafter, the system selection server 50 requests the message relay devices other than the specified message relay device to delete the message relay information.

As described above, the information processing system 1 allows the system selection server 50 to manage information on an established session. When message relay information is updated every time a relay system is changed, the following advantage is obtained. Namely, in the information processing system 1, each of the message relay devices 10 to 10b can prevent a message from being transferred using old message relay information.

As described above, If the system selection server 50 manages, in a centralized manner, an update of message relay information obtained when a relay system is changed, the load may sometimes be high. Accordingly, each of the message relay devices 10 to 10b may also update the message relay information in a distributed manner.

For example, each of the message relay devices 10 to 10b performs a process described below triggered when a system selection table is updated. First, each of the message relay devices 10 to 10b acquires a list of established sessions for services for each of which a relay system is changed and extracts, from the acquired list, a session ID of a session for a message relay device. Specifically, each of the message relay devices 10 to 10b extracts a session ID that is a number added to its own device and that is obtained by performing a remainder calculation on a hash value of a session ID. Furthermore, to increase efficiency, by setting a flag, which is retained in a message relay device, in the message relay information stored in the message relay device, the message relay device may also identify a session ID for its own device.

Then, by referring to the message relay device list, each of the message relay devices 10 to 10b may also identify an address of a message relay device other than its own device and may also send, to the identified address, a request for message relay information to be deleted.

(5) Messages

In the first embodiment, an example of a message has been described with reference to FIG. 11; however, the embodiment is not limited thereto. For example, the message contains therein a transmission source MAC address, a destination MAC address, a source IP address, a port number, a destination IP address, and a port number.

Furthermore, the message contains therein an HTTP protocol header and a message content. The HTTP protocol header contains therein a session ID as part of a Cookie. However, the session ID may also be stored in another field, in a message content, or in a protocol header other that an HTTP.

Furthermore, a query performed by each of the message relay devices 10 to 10b, a transfer of a message, and a control message, such as a response, may also be transmitted by transmitting and receiving information in the same way as that used for transmitting and receiving a message. Specifically, the control message may also contain therein a transmission source MAC address, a destination MAC address, a source IP address, a port number, a destination IP address, and a port number. Furthermore, a session ID may also be contained as a message content.

(6) Process Performed by the System Selection Server 50

In the first embodiment described above, the system selection server 50 acquires, from each of the message relay devices 10 to 10b, the amount of resources, a session establishment count, and a message processing count and calculates a relay method; however, the embodiment is not limited thereto. For example, a sampling node from among the message relay devices 10 to 10b may also perform the same process as that performed by the system selection server 50 and may also notify the other message relay devices of the selected relay method.

Specifically, the function performed by the system selection server 50 may also be included in one of the message relay devices 10 to 10b. Furthermore, the function performed by the system selection server 50 may also be included in all of the message relay devices 10 to 10b and a single representative message relay device may also have a function of the system selection server 50.

(7) Program

Figure 32:
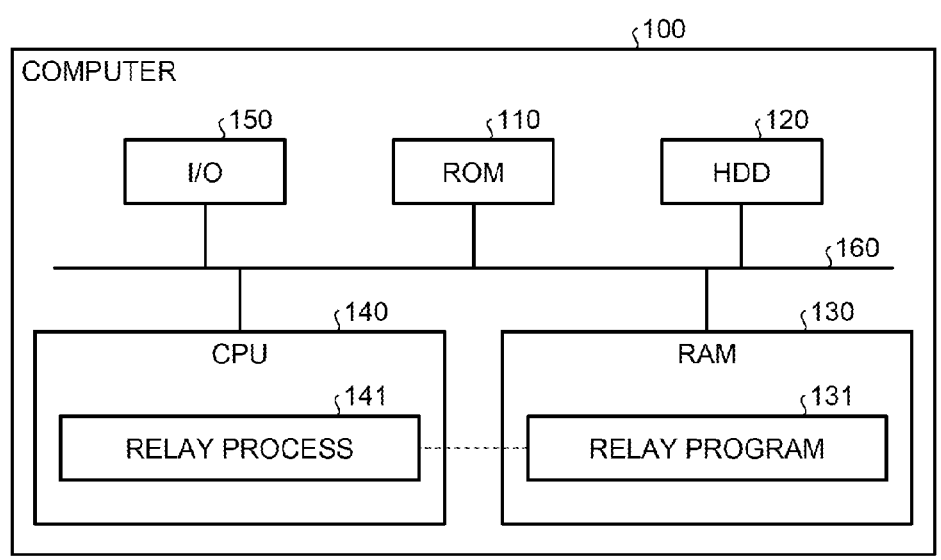
FIG. 32 is a block diagram illustrating an example of a computer that executes a relay program.
Figure 33:
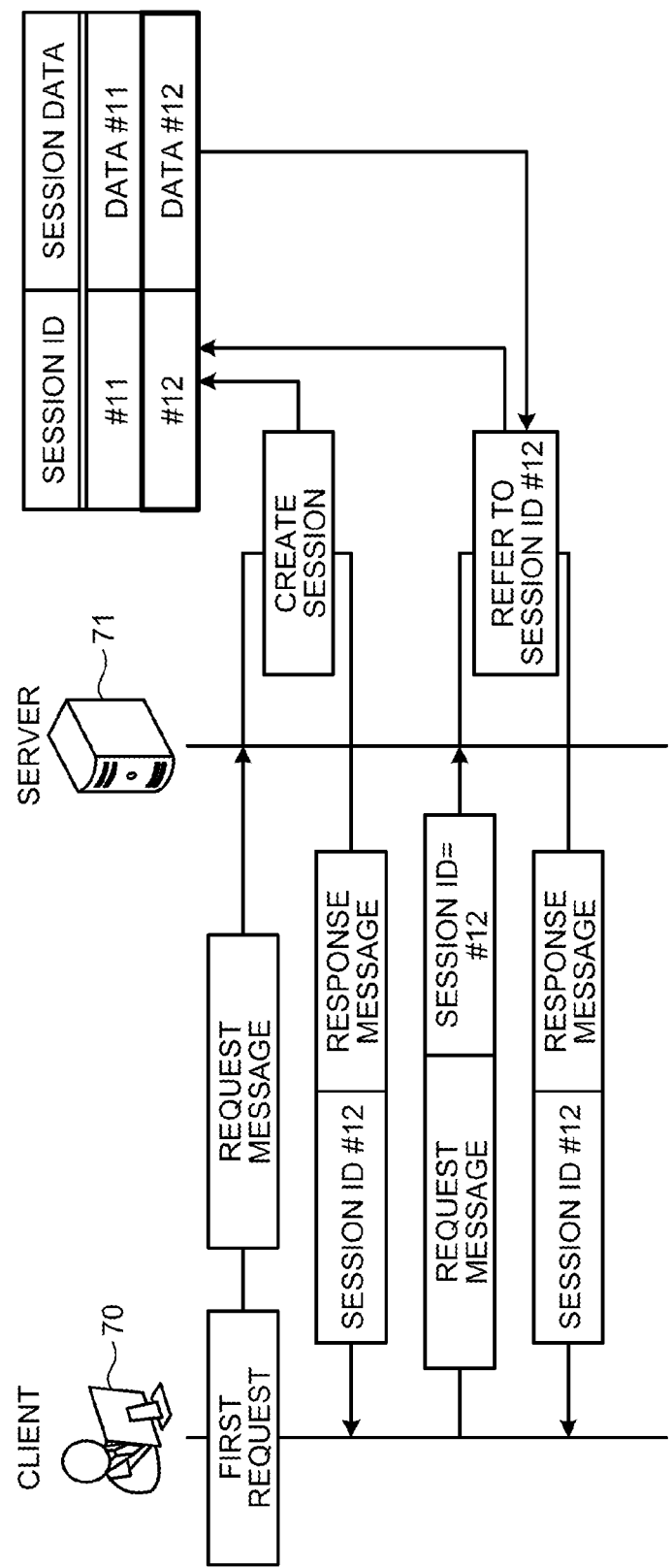
FIG. 33 is a schematic diagram illustrating a process for establishing a session.
Figure 34:
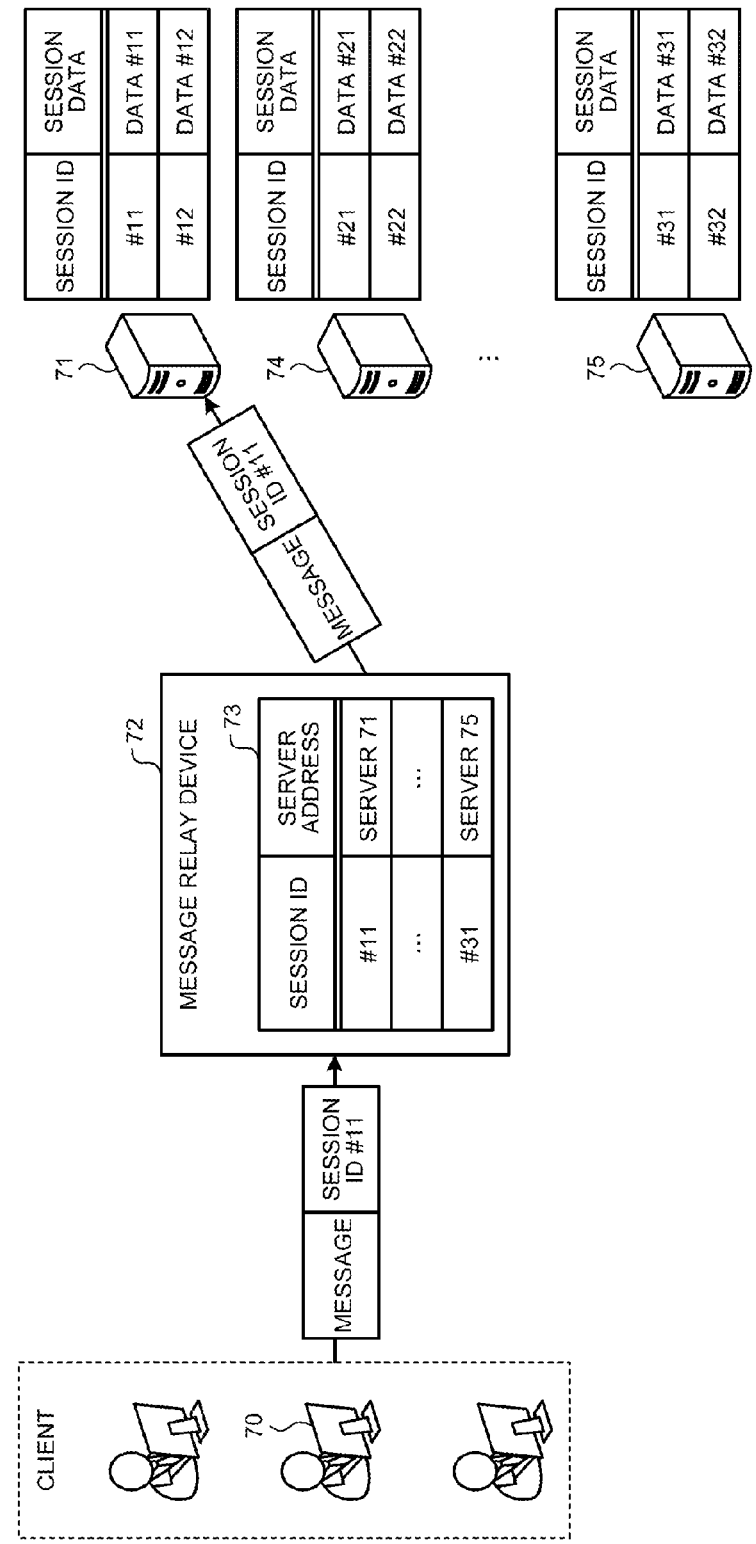
FIG. 34 is a schematic diagram illustrating a technology performed by a message relay device.
Figure 35:
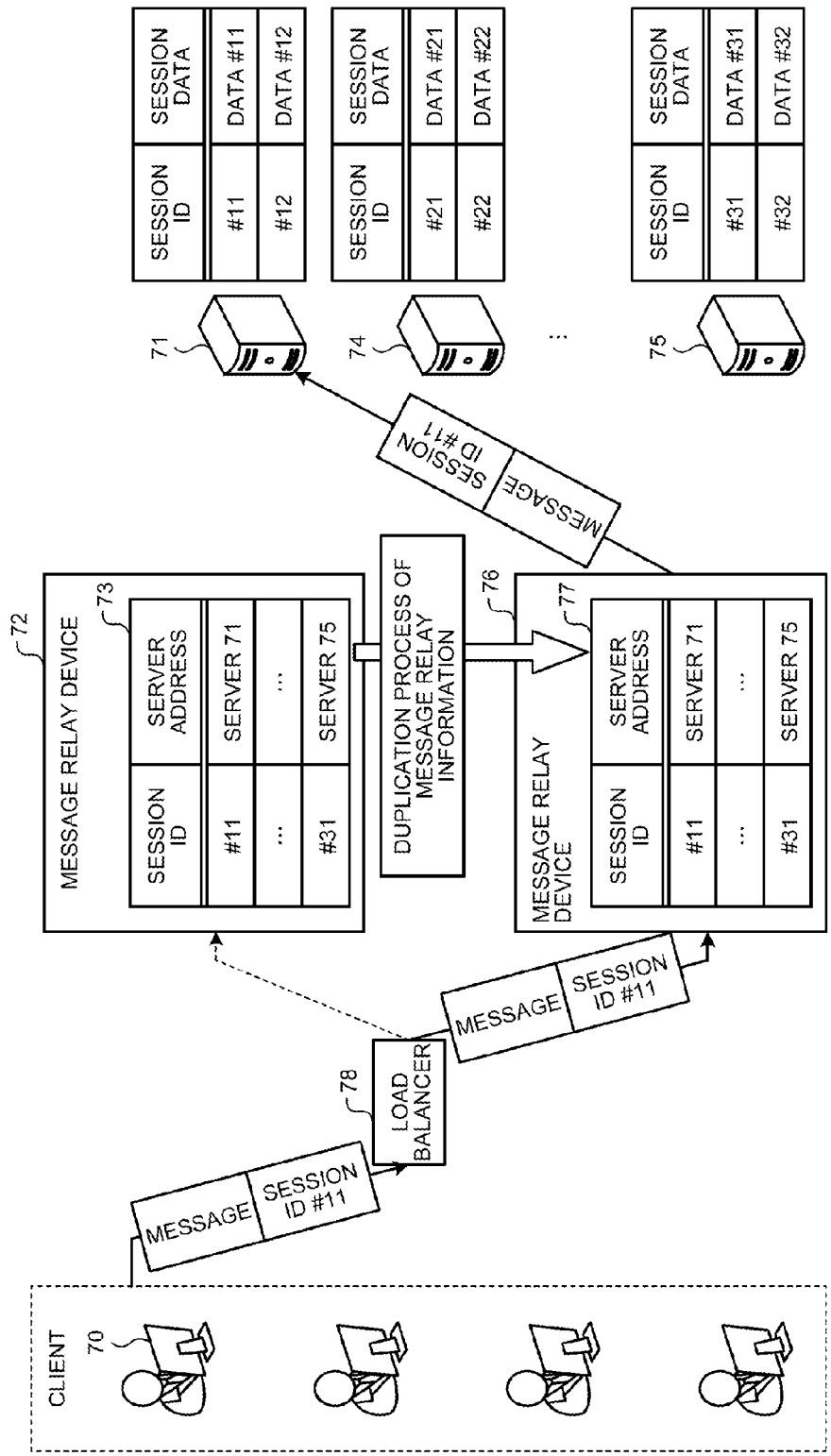
FIG. 35 is a schematic diagram illustrating an information processing system that includes multiple message relay devices.
Figure 36:
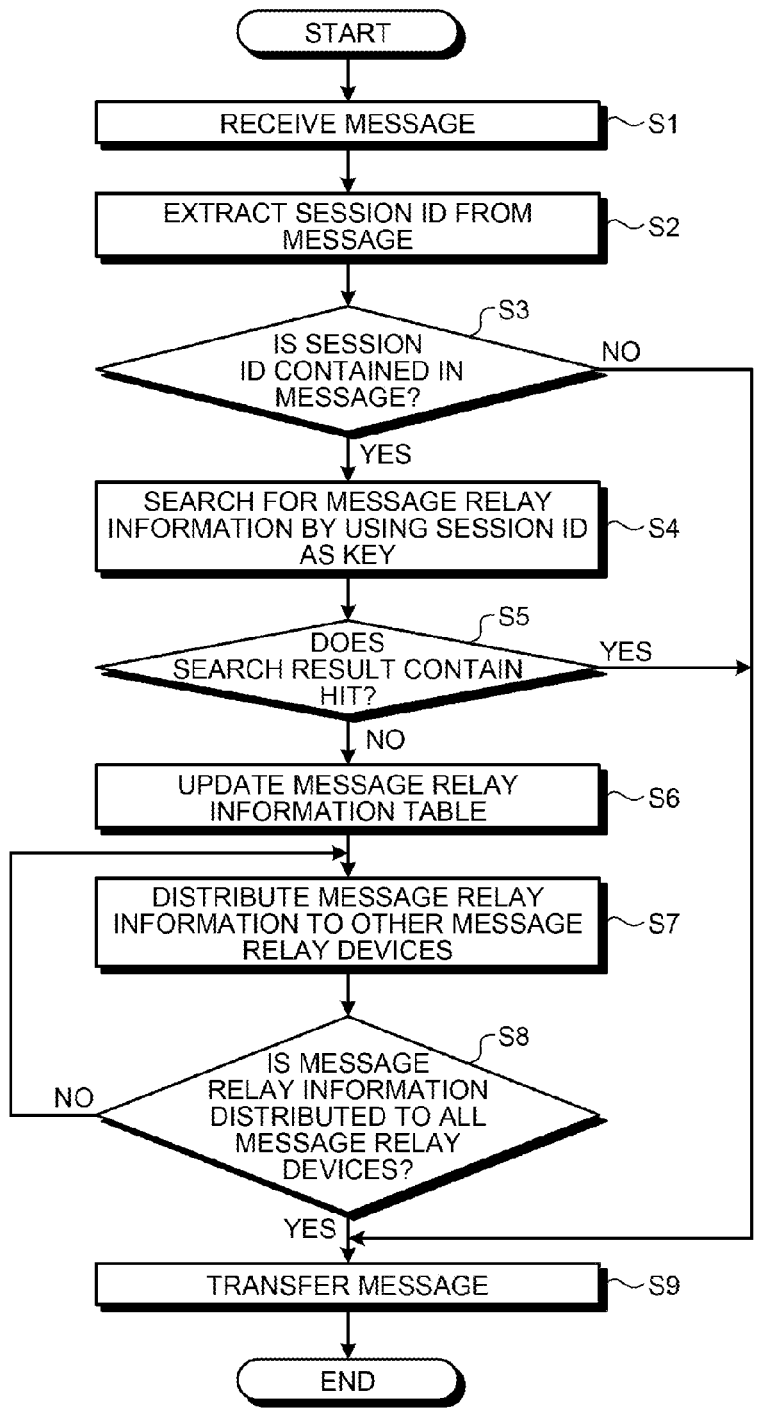
FIG. 36 is a flowchart illustrating the flow of an example of a process for transferring a response.

In the above explanation, a description has been given of a case in which the message relay device 10 according to the first embodiment implements various processes by using hardware; however, the embodiment is not limited thereto. For example, the processes may also be implemented by a program prepared in advance and executed by a computer included in the message relay device 10. Accordingly, in the following, an example of a computer that executes a program having the same function as that performed by the message relay device 10 will be described with reference to FIG. 32. FIG. 32 is a block diagram illustrating an example of a computer that executes a relay program.

A computer 100 illustrated in FIG. 32 includes a read only memory (ROM) 110, a hard disk drive (HDD) 120, a random access memory (RAM) 130, and a central processing unit (CPU) 140, which are connected by a bus 160. Furthermore, the computer 100 illustrated in FIG. 32 includes an input/output (I/O) 150 for transmitting and receiving a message.

The RAM 130 previously stores therein a relay program 131. In the example illustrated in FIG. 32, the CPU 140 reads the relay program 131 from the RAM 130 and executes it so that the relay program 131 functions as a relay process 141. The relay process 141 has the same function as that performed by the message relay device 10 illustrated in FIGS. 5A and 5B.

The relay program described in the embodiment can be implemented by programs prepared in advance and executed by a computer such as a personal computer or a workstation. The program can be distributed via a network, such as the Internet. Furthermore, the program can be stored in a computer-readable recording medium, such as a hard disc drive, a flexible disk (FD), a compact disc read only memory (CD-ROM), a magneto optical disc (MO), and a digital versatile disc (DVD). Furthermore, the program can also be implemented by a computer reading it from the recording medium.

According to an aspect of an embodiment, the throughput of a message relay device can be improved.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A relay device comprising:
a memory; and
a processor coupled to the memory, wherein the processor executes a process comprising:
storing association relationship information in which a session identifier for identifying a session established between a server and a client by a program running on the server is associated with a server identifier for identifying the server to the memory;
determining whether a session identifier contained in a message received from a distributing device is contained in the association relationship information stored at the storing;
selecting, when it is determined at the determining that the session identifier contained in the received message is not contained in the association relationship information, a relay system used when the received message is transferred to the server in accordance with a program that has established a session indicated by the session identifier contained in the message; and
transferring the message by using the relay system selected at the selecting.

2. The relay device according to claim 1, wherein the selecting includes selecting the relay system in accordance with the update frequency of the session indicated by the session identifier contained in the message.

3. The relay device according to claim 1, wherein the selecting includes selecting a method for the relay system from among a method for synchronizing association relationship information stored in multiple relay devices, each of which transfers a message to multiple servers, and for transferring the message received by each of the relay devices to the servers, a method for transferring a message to another relay device that stores therein the association relationship information containing the session identifier contained in the received message and for transferring the message to a server by the relay device that corresponds to the transfer destination of the message, a method for querying the other relay device that stores therein the association relationship information containing the session identifier contained in the received message about a server that is associated with the session identifier and for transferring the message to a server notified as a query result, and a method for transferring the message to the server notified as the query result and for caching the server notified as the query result.

4. The relay device according to claim 3, wherein
the processor executes the process further comprising calculating, by using the update frequency of the session, the amount of resources consumed when the association relationship information is synchronized, the amount of resources consumed when the message is transferred to the other relay device, and the amount of resources consumed when a query about the server is sent, calculates the throughput obtained when each relay system is operated; wherein
the selecting includes selecting the method for relay system having the maximum throughput calculated at the calculating.

5. The relay device according to claim 4, wherein
the processor executes the process further comprising measuring the update frequency of a session updated by the program, the amount of resources consumed when the association relationship information is synchronized, the amount of resources consumed when the message is transferred to the other relay device, and the amount of resources consumed when the query about the server is sent, wherein
the calculating includes calculating, by using the update frequency and the amount of resources measured at the measuring, the throughput obtained when each relay system is operated.

6. The relay device according to claim 1, wherein
the determining includes determining, when the relay device received a response to the message transferred at the transferring from the server, whether there is, contained in the association relationship information, information in which a session identifier contained in the response is associated with a response-source server, and
the selecting includes selecting, when it is determined at the determining that there is not the information in which the session identifier contained in the response is associated with the response-source server, a relay system used for transferring the message containing the session identifier to the server in accordance with the program that has established the session indicated by the session identifier.

7. The relay device according to claim 6, wherein
the transferring includes transferring, when it is determined at the determining that there is, contained in the association relationship information, the information in which the session identifier contained in the response is associated with the response-source server, the response to a client that has issued a message that is the source of the response or to the other relay device that corresponds to a transfer source of the message that is the source of the response.

8. The relay device according to claim 1, wherein
the selecting includes creating relay system selecting information in which a relay system that is selected for the message containing the session identifier is associated with the program that has established the session indicated by the session identifier, and
the transferring includes:
identifying, when it is determined at the determining that the session identifier is not contained in the association relationship information, a relay system associated with the program that has established the session indicated by the session identifier from the relay system selecting information; and
transferring the message by using the identified relay system.

9. An information processing system comprising:
multiple servers each of which provides a service to a client;
multiple relay devices each of which transfers, when a message issued by the client is received, the received message to one of the servers; and
a distributing device that distributes the message issued by the client to each of the relay devices, wherein
each of the relay devices includes:
a memory; and
a processor coupled to the memory, wherein the processor executes a process comprising:
storing association relationship information in which a session identifier for identifying a session established between a server and the client by a program running on the server is associated with the server identifier for identifying the server to the memory;
determining whether a session identifier contained in a message received from the distributing device is contained in the association relationship information stored at the storing;
selecting, when it is determined at the determining that the session identifier contained in the received message is not contained in the association relationship information, a relay system used when the received message is transferred to the server in accordance with a program that has established a session indicated by the session identifier contained in the message, and
transferring the message by using the relay system selected at the selecting.

10. A computer-readable recording medium having stored therein a program for causing a computer to execute a relay process comprising:
determining, by a storage device that stores therein association relationship information in which a session identifier for identifying a session established between a server and a client by a program running on the server is associated with a server identifier for identifying the server, whether a session identifier contained in a message received from a distributing device is stored;
selecting, when it is determined at the determining that the session identifier contained in the received message is not stored in the storage device, a relay system used when the received message is transferred to the server in accordance with a program that has established a session indicated by the session identifier contained in the message; and
transferring the message by using the relay system selected at the selecting.

* * * * *